March 21, 1967  T. A. STANSBURY  3,310,806

COOPERATIVE COLLISION AVOIDANCE SYSTEM

Original Filed April 11, 1963

INVENTOR.
THOMAS A. STANSBURY

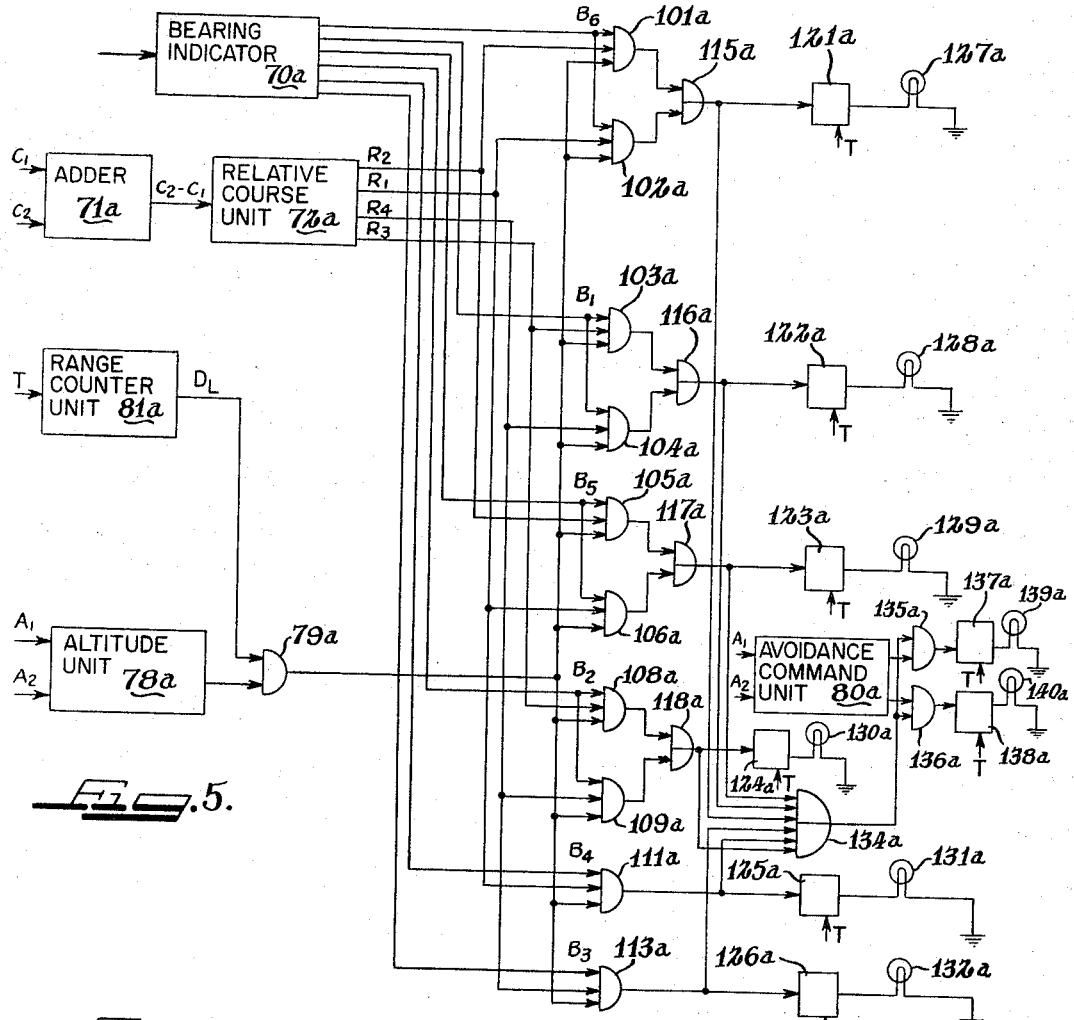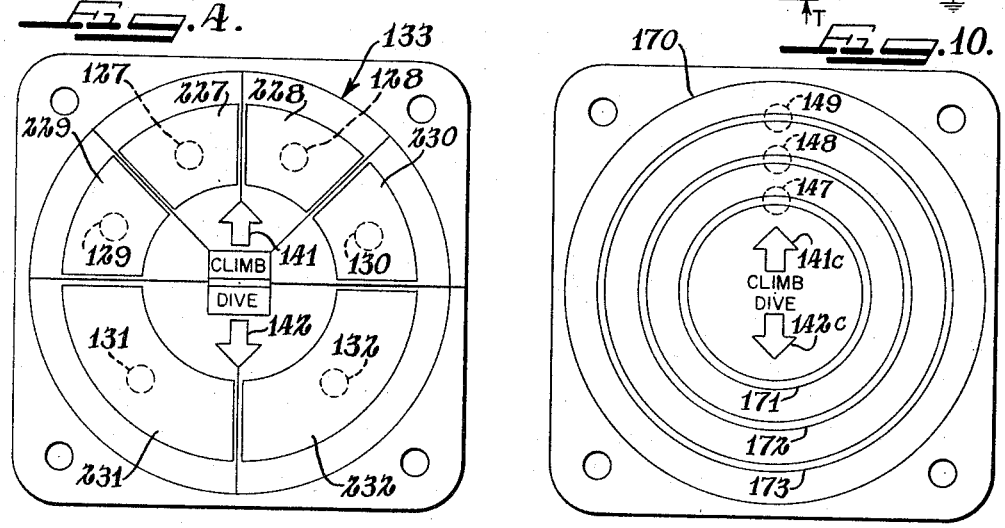

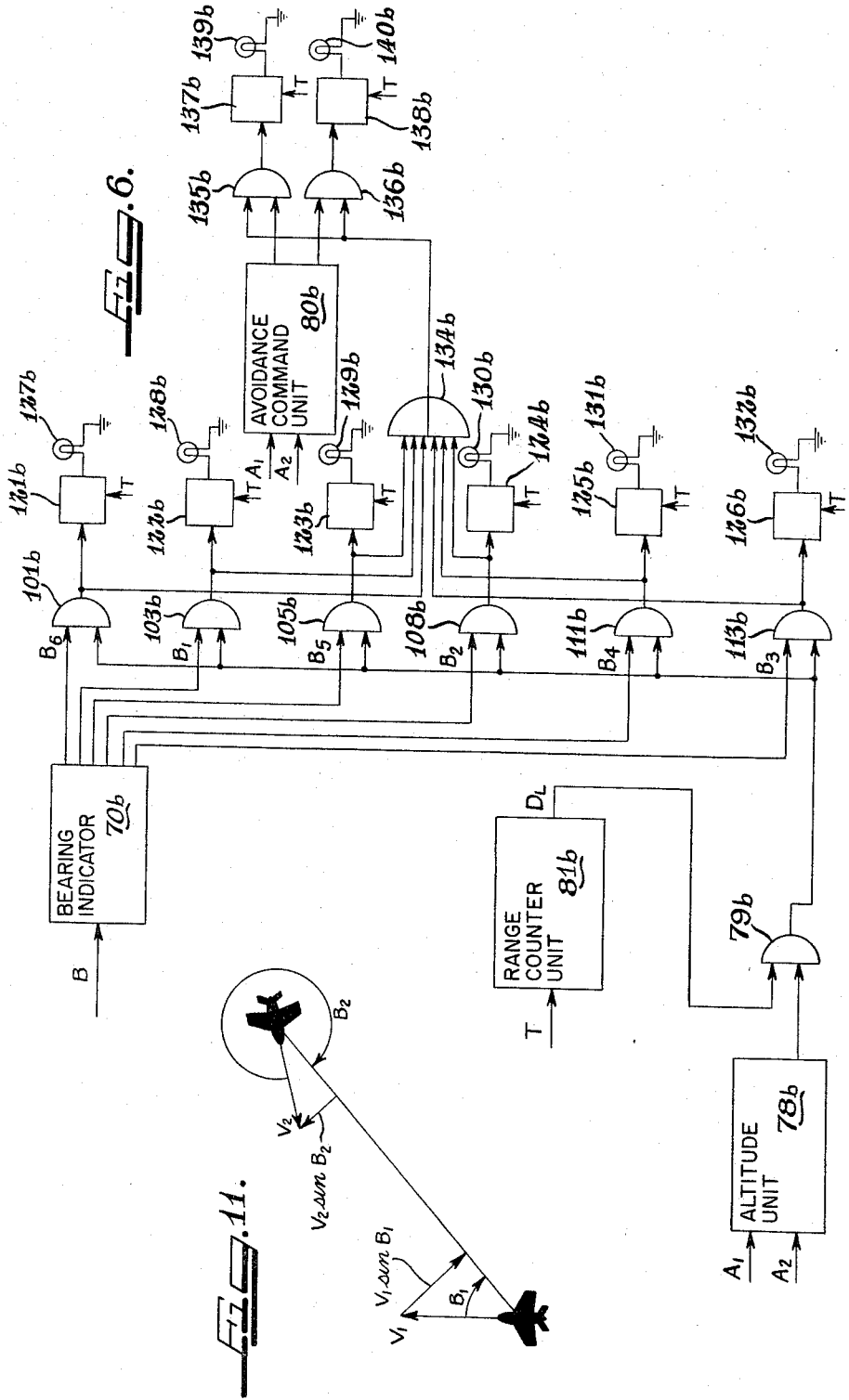

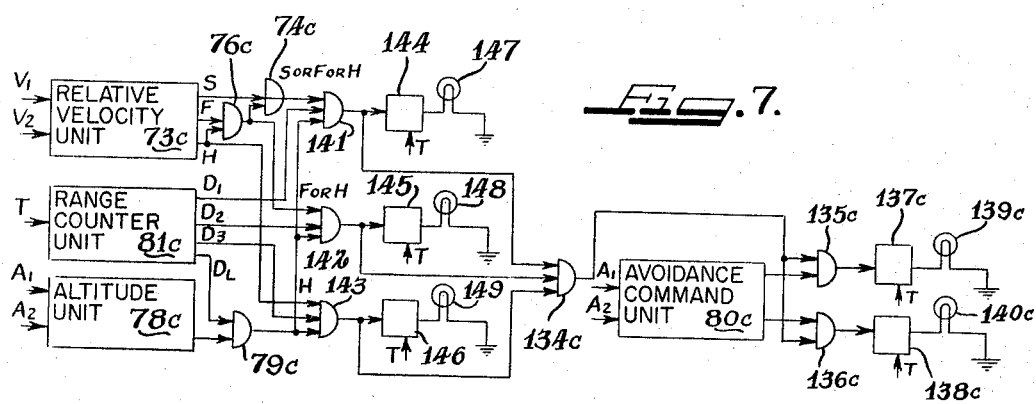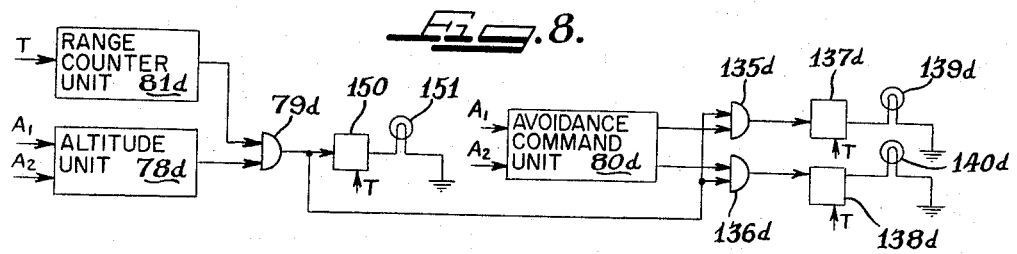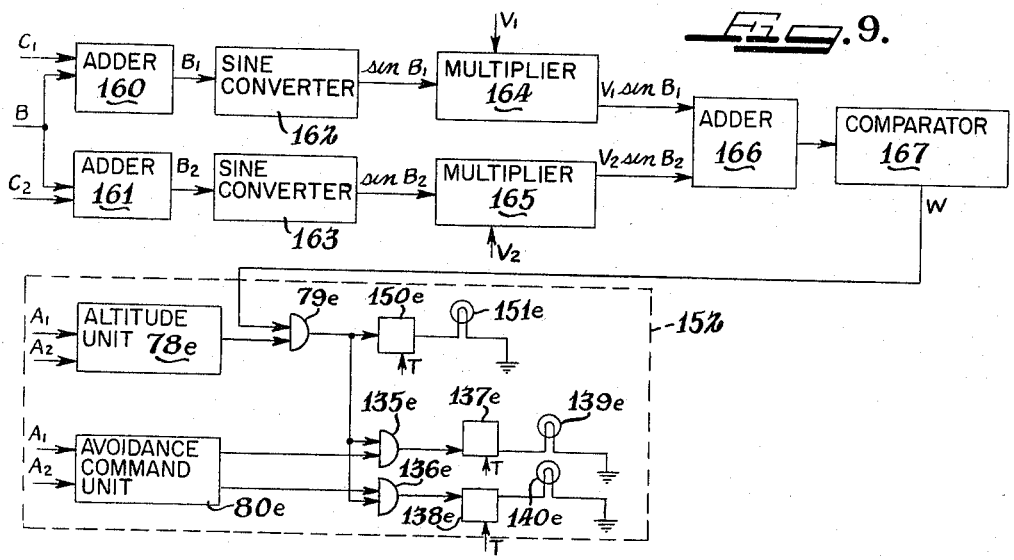

United States Patent Office 3,310,806
Patented Mar. 21, 1967

3,310,806
COOPERATIVE COLLISION AVOIDANCE
SYSTEM
Thomas A. Stansbury, Opera Bldg., 20 N. Wacker Drive,
Chicago, Ill. 60606
Continuation of application Ser. No. 272,396, Apr. 11,
1963. This application Apr. 1, 1965, Ser. No. 448,554
65 Claims. (Cl. 343—112)

This application is a continuation of my application Ser. No. 272,396, filed Apr. 11, 1963, now abandoned.

The present invention relates to navigational aids and particularly to systems and methods for preventing collisions between aircraft and between aircraft and stationary obstacles.

There have been a number of passive systems proposed for preventing the occurrence of mid-air collisions between aircraft, but these have all been found to be either impractical or not technically feasible. There have been a number of active systems proposed for preventing the collision of aircraft, but these systems have all required the carrying, by each aircraft operating in the system, of a specific quantity of equipment. Therefore, it has been found that in order to obtain optimum performance in one of these systems for a large, heavy, high-performance aircraft, the required equipment was impractical for a small, low-performance aircraft, or conversely if the equipment is designed for optimum performance with minimum weight, size and power drain characteristics in a small aircraft, it was incapable of providing adequate information for a large, high-performance aircraft to reliably avoid mid-air collisions. The present invention overcomes this disadvantage by providing a navigation collision warning system which encompasses the utilization of equipment, of various sizes and of various performance capabilities wherein the specific equipment carried by each aircraft in accordance with the system is constructed to have characteristics compatible with the size and performance capability of the aircraft.

There are five parameters which may be utilized in determining a collision hazard. They are the relative altitudes of two aircraft, their relative courses or headings, their relative velocities, the range between them, and the bearing of one aircraft from the other. All the systems that have been proposed in the past require the utilization of a particular set of parameters selected from these five parameters to determine whether two aircraft are a collision hazard to each other. Under prior systems, every aircraft operating in the system which was expected to have the capability of avoiding another aircraft would carry equipment which required the use of each and every parameter in the preselected set of parameters to determine whether a possible collision hazard existed. Thus, the smaller, low-performance aircraft would be required under such previously proposed systems to carry the same complicated equipment as the large, high-performance aircraft. This has been a highly undesirable penalty to place upon the small, low-performance aircraft because they do not require such precise navigational information to avoid a collision as do the large, high-performance aircraft. The fact that these prior proposed systems have placed such a heavy penalty on the small, low-performance aircraft has contributed to their failure to be adopted as generally standardized systems. The present invention, on the other hand, provides for the availability of all five parameters, but makes it possible for the equipment in any given aircraft to be designed to take advantage of only so many of the parameters as are required for that aircraft to obtain sufficient collision warning information. Thus, for the first time, a system is available wherein one aircraft can utilize up to all five parameters in estimating a collision hazard, and, therefore, make only a few deviations from its course to avoid other aircraft, while another aircraft can use only one or two of these parameters to provide it with sufficient collision hazard information to avoid all other aircraft, which it is capable of avoiding by virtue of its performance capability in relationship to the performance of the other aircraft.

It is, therefore, an object of the present invention to provide a new and improved collision prevention system.

An object of the present invention is to provide a collision prevention system wherein each aircraft participating in the system transmits signals indicative of its altitude, course and velocity, and each aircraft desiring collision avoidance information may utilize its and another aircraft's relative altitudes, courses and velocities, the range between the two aircraft, and the relative bearing of the other aircraft to determine whether the other aircraft is a collision hazard, or it may use any one or combination less than the full five parameters to determine the probability of a collision hazard being presented by the other aircraft.

Another object is to provide a collision prevention system wherein an aircraft transmits signals indicative of its altitude and course, and another aircraft may carry any equipment which utilizes one or any combination of the four parameters of relative altitude of the two aircraft, relative courses of the two aircraft, range between the aircraft, and the bearing of one aircraft from the other to determine the probability of one aircraft being a collision hazard to the other.

An additional object of the present invention is to provide a collision prevention system wherein an aircraft transmits signals indicative of its altitude and another aircraft having suitable receiving equipment and computing equipment utilizes the relative altitude of the two aircraft, and one or both of the parameters of range between the two aircraft and the bearing of one craft from the other to determine whether a potential collision hazard exists between the two aircraft.

A further object is to provide a collision prevention system wherein any one, all or combinations of the relative altitudes of two aircraft, the courses of two aircraft, and the velocity of two aircraft may be utilized, with either or both of the parameters of range between the aircraft and bearing of one aircraft from the other, for determining whether the aircrafts are a hazard to each other and wherein the utilized parameters are divided into ranges or bands of values which, for computation purposes, are considered to be a single value.

Still another object is to provide a collision prevention system wherein velocity vector components of two aircraft, which are perpendicular to a line of bearing between the two aircraft, are compared to determine whether the aircraft are a collision hazard to each other.

Yet another object is to provide a collision prevention system for surface craft wherein one, all, or a combination of some of the parameters of relative courses of two craft, their relative velocities, the range between the two craft and the bearing of one craft from the other may be utilized in determining whether a potential collision hazard exists between the craft.

A primary object is to provide a new and improved method of indicating that a craft is a collision hazard to another craft.

A further primary object is to provide a method of indicating that a craft is a collision hazard to another craft by utilizing one, all, or a combination of some of the parameters of the relative altitudes of two craft, their relative courses, their relative velocities, the range between two craft and the bearing of one craft from the other.

Further objects and advantages will become apparent from the following detailed description taken in connection with the accompanying drawings in which:

FIGURE 4 is a front elevational view of a collision avoidance indication utilized with the computer illustrated in FIGURE 2;

FIGURE 5 is a schematic block diagram showing an alternative computer suitable for use as a portion of the embodiment of the invention illustrated in FIGURE 1;

FIGURE 6 is a schematic block diagram of an alternative computer suitable for use as a portion of the embodiment of the invention illustrated in FIGURE 1;

FIGURE 7 is a schematic block diagram of an alternative computer suitable for use as a portion of the embodiment of the invention illustrated in FIGURE 1;

FIGURE 8 is a schematic block diagram of an alternative computer suitable for use as a portion of the embodiment of the invention illustrated in FIGURE 1;

FIGURE 9 is a schematic block diagram of an alternative computer suitable for utilization in the embodiment of the invention illustrated in FIGURE 1;

FIGURE 10 is a front elevational view of a collision avoidance indicator utilized with the computer illustrated in FIGURE 7; and FIGURE 11 is a vector diagram illustrating the relative velocities to the direction of the line of sight of two aircraft which could be on a collision course.

Figure 1:
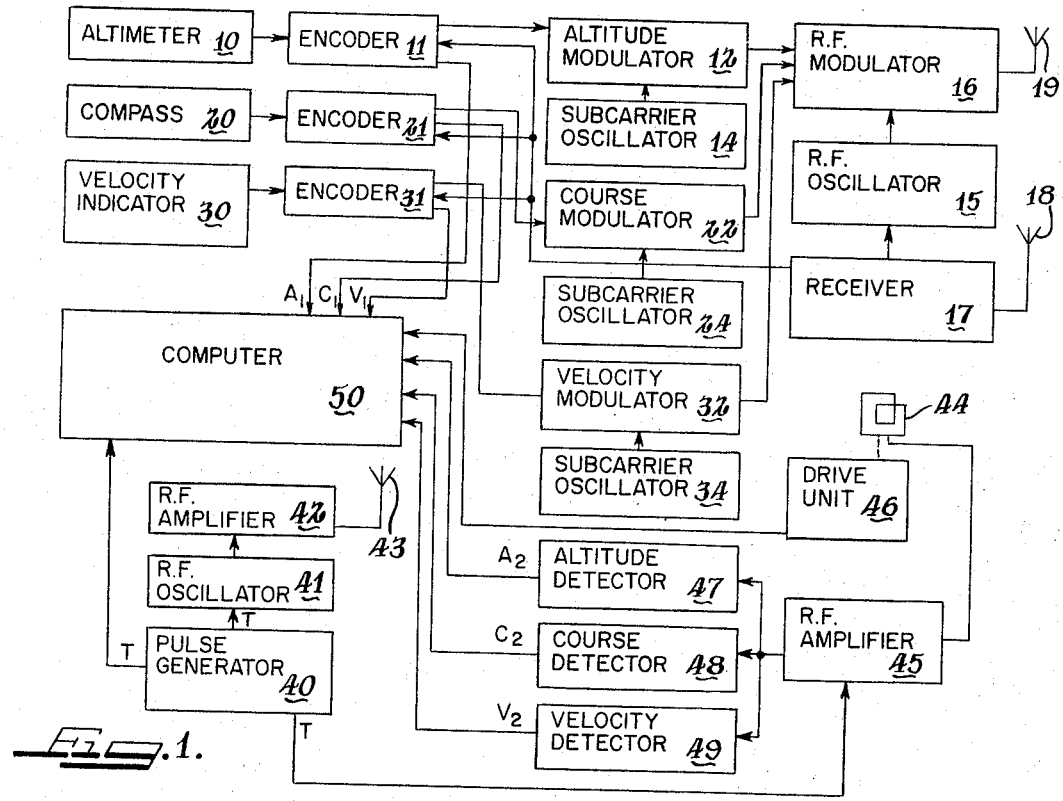
FIGURE 1 is a schematic block diagram of a preferred embodiment of the present invention.

While this invention is susceptible of embodiment in many different forms, there is shown in the drawings and will herein be described in detail, embodiments of the invention with the understanding that the present disclosure is to be considered as an exemplification of the principle of the invention and is not intended to limit the invention to the embodiments illustrated. The scope of the invention will be pointed out in the appended claims.

Whereas previously proposed collision prevention systems have utilized only one selected group of parameters for computing whether a possible collision hazard exists between two aircraft so that every aircraft desiring such information was required to carry equipment of exactly the same complexity regardless of its size and performance capabilities, the present invention provides a system wherein the complexity of the equipment required by any aircraft desiring information of a potential hazard is varied in accordance with the size and performance capabilities of the aircraft by utilizing all five parameters or any one of a large number of subcombinations of these five parameters. With the present invention, the complexity of the equipment for one aircraft is made compatible with its size and performance capability without affecting the complexity or capability of the equipment carried by another aircraft. A preferred embodiment of the invention utilizing all five parameters will be described, and then other preferred embodiments of the invention which are similar, but less complex, will be described.

Referring to FIGURE 1, an altimeter 10 has a shaft output which is connected to a binary encoder 11 to produce a binary coded signal which is indicative of the altitude of the aircraft carrying the equipment illustrated in FIGURE 1. The binary code produced by the encoder 11 is a ten bit binary code having a discreet binary code number for each 100 ft. of altitude above sea level. The binary code signal produced by the encoder 11 is transferred at periodic intervals to an altitude subcarrier modulator 12 which is connected to a subcarrier oscillator 14 to modulate a subcarrier produced by the oscillator 14 periodically with the binary signal which is indicative of altitude. The subcarrier signal is modulated on an RF carrier, which is produced by an RF oscillator 15, by an RF modulator 16 connected to the altitude subcarrier modulator 12 and the RF oscillator 15. The RF oscillator 15 is connected to a receiver 17 which activates the RF oscillator 15 to provide a carrier frequency to the RF modulator 16 when the receiver 17 receives an interrogating signal through an omnidirectional receiving antenna 18 connected to it. When the receiver 17 sends a signal to the RF oscillator 15 to activate it, the carrier signal is amplified in the modulator 16 and modulated by the altitude subcarrier signal and other subcarrier signals before being transmitted by an omnidirectional antenna 19 connected to the output of the RF modulator 16.

A flux gate compass 20 is mechanically connected to a binary encoder 21 which produces a ten bit binary code signal indicative of the course of the aircraft as sensed by the compass 20. An output of the encoder 21 and an output of a subcarrier oscillator 24 are connected to a modulator 22 wherein the binary signal indicative of the aircraft course is modulated on a subcarrier produced by the subcarrier oscillator 24. The course modulator 22 is connected to the RF modulator 16 to modulate the RF carrier periodically with the binary coded subcarrier signal indicative of the aircraft course.

A velocity indicator 30 has an output connected to a binary encoder 31 which produces a binary coded signal indicative of the velocity of the aircraft. The encoder 31 and a subcarrier oscillator 34 are connected to a velocity modulator 32 to modulate the binary coded signal indicative of the aircraft's velocity onto a subcarrier produced by the subcarrier oscillator 34. The output of the velocity modulator 32 is connected to the RF modulator 16 in order to modulate the RF carrier produced by the oscillator 15 with a binary coded subcarrier signal indicative of the aircraft's velocity.

The receiver 17 has an output trigger signal connected to the encoders 11, 21 and 31 in addition to its connection to the RF oscillator 15 so that, when the oscillator 15 is turned on after receiver 17 has received an interrogating pulse through its antenna 18, the encoders synchronously provide their encoded binary signals indicative of altitude, course and velocity of the aircraft to the modulators so that an RF carrier pulse is radiated from the antenna 19 which has three subcarriers, each having a binary coded signal modulated thereon which is indicative of altitude, heading and velocity, respectively.

Thus, the portion of the embodiment of the invention shown in FIGURE 1 thus far described provides a carrier signal having subcarriers thereon which transmit altitude, course and velocity of the aircraft carrying this equipment whenever the system is triggered by an interrogation pulse received by the receiver 17 through the antenna 18. This portion of the system is refered to as a "minimum station" because it carries all of the equipment that is necessary to transmit the altitude, course and velocity data of one aircraft to another when the system is triggered by an interrogation signal from the other aircraft. An aircraft upon which it is not desired to obtain collision hazard information can carry a device consisting of these components thus far described and provide all data which might be desired by another aircraft in determining whether a potential collision hazard exists between the two aircraft.

If an aircraft desires to utilize the altitude, course and velocity of another aircraft in determining whether the two aircraft are a collision hazard to each other, it may carry as a part of the system all of the components schematically illustrated in FIGURE 1. In order to interrogate another aircraft, a timing pulse generator 40 is connected to an RF oscillator 41 which produces an RF carrier pulse, which is an interrogation pulse, whenever it is triggered by the pulse generator 40. The RF carrier pulse is amplified in an RF amplifier 42 connected to the oscillator 41 and radiated by an omnidirectional antenna 43 which is connected to the output of the RF oscillator 42. When a pulse transmitted through the antenna 43 arrives at another aircraft having at least the minimum station previously described, a reply pulse is transmitted by it having signals indicative of the other aircraft's altitude, course and velocity modulated thereon. Such a reply signal may be received by a directional antenna 44 as it scans a 360 degree arc in the horizontal plane. If the antenna 44 is facing the incoming signal so that it is received and amplified, the bearing of the antenna indicates the bearing of the other aircraft from the aircraft carrying the system illustrated in FIGURE 1. An incoming signal is received in the RF amplifier 45 connected to the antenna 44. The antenna 44 is rotated by an antenna drive unit 46 which rotates the antenna 44 at a speed of approximately ten revolutions per minute. An altitude subcarrier frequency detector 47, a course subcarrier frequency detector 48 and a velocity subcarrier frequency detector 49 are all connected to the output of the RF amplifier 45 for the purpose of detecting the altitude, course and velocity subcarrier frequency signals which they transfer to a computer 50 through suitable wiring connections. Thus, the computer 50 receives the altitude $A_2$, the course $C_2$ and the velocity $V_2$ of another aircraft referred herein as a second aircraft through radio transmission means. The aircraft carrying equipment shown in FIGURE 1 will be referred to herein as the first aircraft.

The computer 50 also is able to receive simultaneously with the altitude, course and velocity of a second aircraft its bearing by having a connection to the antenna drive unit 46 through which is transmitted the bearing B of the antenna 44 at the time any particular return signal is received from the second aircraft. The pulse generator 40 is connected to the computer 50 to issue the same timing pulse to computer 50 that triggers the RF oscillator 41 and produces an interrogation pulse. The computer 50 computes the elapsed time between the transmitted signal and a reply signal for the purpose of calculating the range of a second aircraft from the first aircraft.

An output of each of the encoders 11, 21 and 31 is also connected to the computer 50 so that the ten bit binary codes contained in the encoders may be read into the computer 50 to make available the altitude $A_1$, the course $C_1$ and the velocity $V_1$ of the first aircraft carrying the equipment symbolically illustrated in FIGURE 1.

Figure 3:
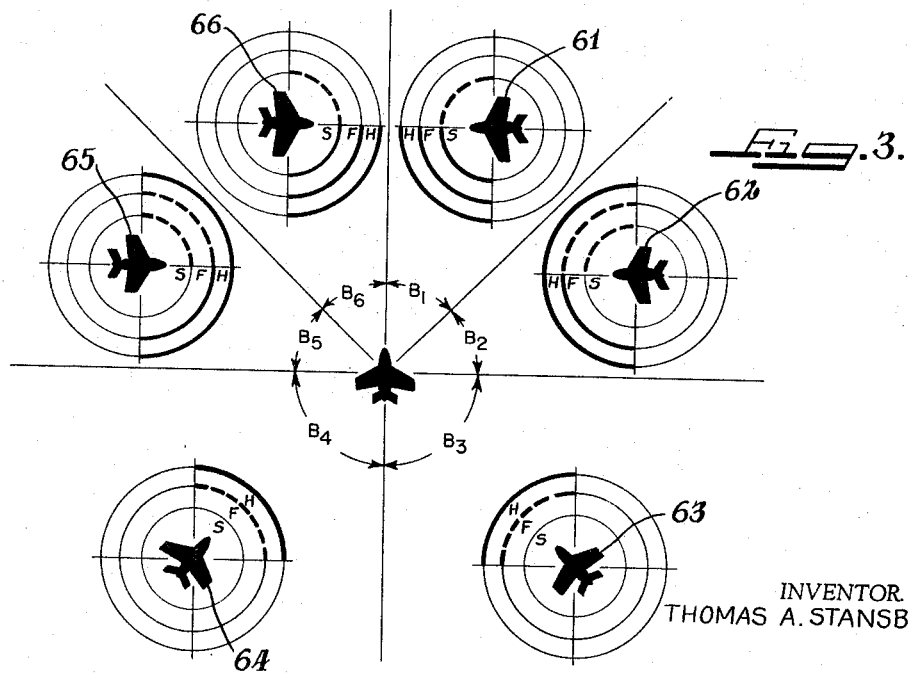
FIGURE 3 is a situation diagram illustrating the relationship of parameters utilized by the computer illustrated in FIGURE 2.
Figure 2:
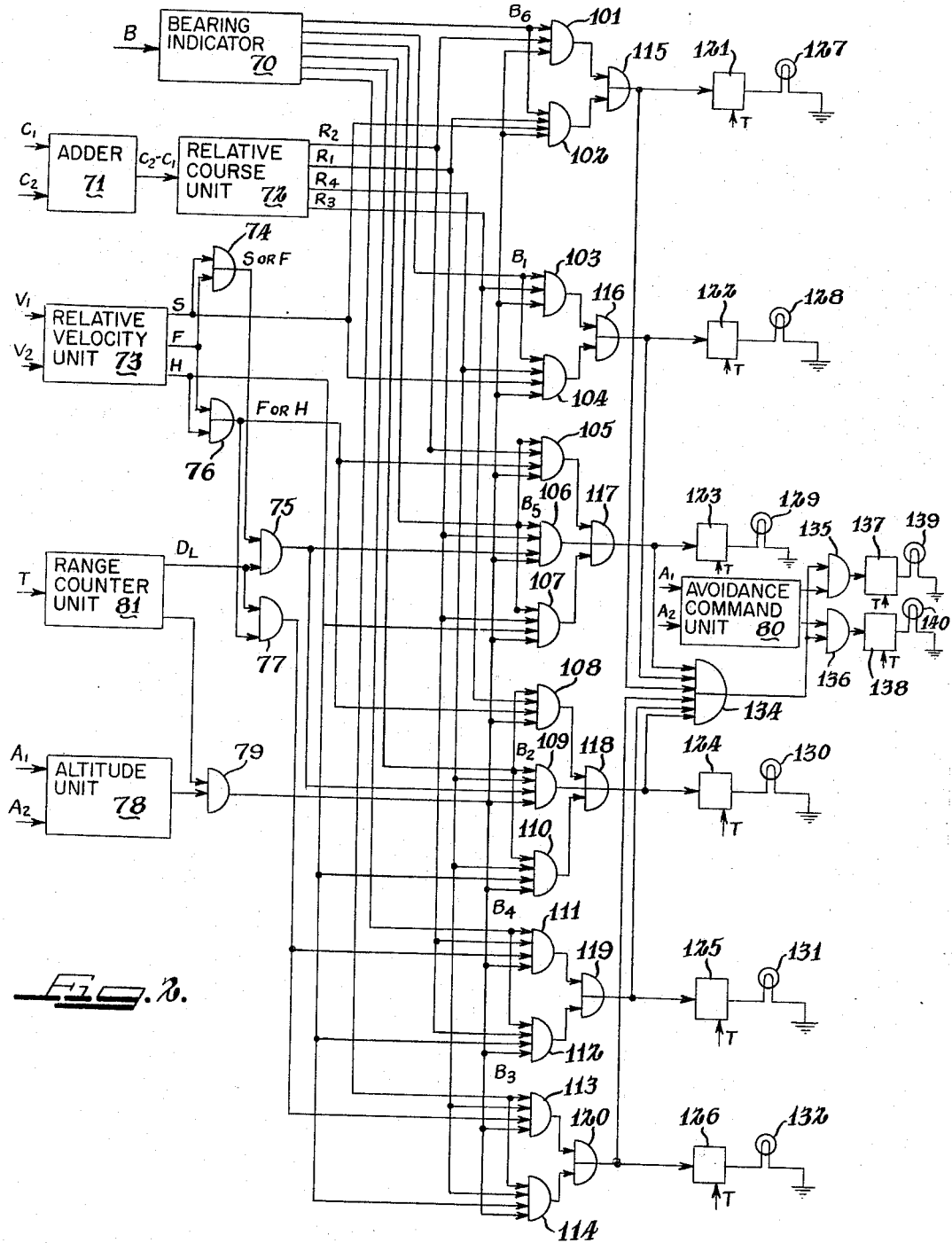
FIGURE 2 is a schematic block diagram of a computer which forms a portion of the embodiment of the invention illustrated in FIGURE 1.

FIGURE 2 illustrates a computer suitable for use as computer 50 shown in FIGURE 1 which may utilize all of the parameters that can be received by the computer 50. In the past, all computers which were designed for the computation of a mid-air collision hazard required high accuracy in the reception of parameters utilized in computing the hazard problem. The computer illustrated in FIGURE 2 is a greatly simplified design because it separates the entire span of all possible values of each parameter into a series of ranges or bands of values and treats each band of values as if it were a single value in performing the computations. Referring to FIGURE 3, the relative position of a second aircraft from the first aircraft together with the division of all possible values of the parameter into a relatively small number of bands of values for each parameter is diagramed. The first aircraft which is carrying the system illustrated in FIGURE 1 and the computer illustrated in FIGURE 2 is shown at the center of the diagram. All possible relative bearing values from zero degrees to 360 degrees are divided into six bearing bands or sectors $B_1$–$B_6$, as indicated in FIGURE 3 and Table I.

*Table I*

| Bearing sector: | Relative bearing included, degrees |
|---|---|
| $B_1$ | 0–045 |
| $B_2$ | 045–090 |
| $B_3$ | 090–180 |
| $B_4$ | 180–270 |
| $B_5$ | 270–315 |
| $B_6$ | 315–360 |

Each of a set of six aircraft symbols 61–66 is positioned in one of the bearing sectors $B_1$–$B_6$ to indicate by the arcs and relative bearing lines near each one the division of courses of these aircrafts relative to the course of the first aircraft and the division of speeds relative to the first aircraft. Each one of the solid and dashed arcs near each one of the aircraft symbols 61–66 represents a band of courses relative to the first aircraft course and a band of velocities relative to the first aircraft which would make an aircraft a possible collision hazard if it were a second aircraft in the indicated bearing sector from the first aircraft. Table II illustrates the division of the second aircraft's courses relative to the course of the first aircraft into four bands or sectors covering the relative courses of zero through 360 degrees.

*Table II*

| Relative course sector: | Relative courses included, degrees |
|---|---|
| $R_1$ | 0–090 |
| $R_2$ | 090–180 |
| $R_3$ | 180–270 |
| $R_4$ | 270–360 |

The bands of values of the relative speeds of the second aircraft to the first aircraft are indicated by the distance of the arcs from the center of each respective aircraft symbol 61–66 in FIGURE 3 and are tabulated in TABLE III.

*Table III*

| Symbol: | Relative velocity of $V_2$ to $V_1$ |
|---|---|
| S | $V_2 < V_1$ |
| F | $V_1 + 150$ kts. $> V_2 > V_1$ |
| H | $V_2 > V_1 + 150$ kts. |

The symbol S indicates that the second aircraft is slower than the first aircraft; the symbol F indicates that the second aircraft is faster than the first aircraft, but less than the speed of the first aircraft plus 150 knots, and the symbol H indicates that the second aircraft is a relatively higher performance aircraft than the first aircraft having a speed of 150 knots or greater beyond that of the first aircraft.

As will be presently described in detail, the computer symbolically illustrated in FIGURE 2 will examine the relative altitudes, courses and velocities of the two aircraft, the range between two aircraft and the bearing of the second aircraft from the first aircraft to determine whether a collision hazard exists between the two aircraft. The possible values of range are divided into three range bands of zero to 16 miles from the first aircraft $D_1$, 16 miles to 36 miles from the first aircraft $D_2$, and greater than 36 miles $D_L$. A solid arc around one of the aircraft's symbols 61–66 indicates that the relative course sector and the relative velocity band represented by that arc indicate a hazard existing between the two aircraft regardless of the range of the second aircraft from the first aircraft. The dashed arcs indicate that the arc representing a particular relative course sector and relative velocity band can indicate the presence of a collision hazard only when the second aircraft is within a particular range band of values from said first aircraft. Since, of the five parameters used by the computer illustrated in FIGURE 2, bearing is divided into six sectors, relative course is divided into four sectors, relative velocity is divided into three bands, there are seventy-two combinations of these values to be considered in determining the collision problem when the first and second aircraft are at approximately the same altitudes to one another and prior to considering the range between the aircraft. As indicated in FIGURE 3, of the seventy-two combinations, twenty-two are combinations from which the potentiality of a collision should be indicated, for there are twenty-two danger situations shown by twenty-two solid line and dashed line arcs in the diagrammatic representation of FIGURE 3. When the distance is considered between the aircraft in three bands of values as aforementioned, the percentage of combinations of the bands of parameters which indicate a hazard to the total number of combinations utilized by the computer decreases. Thus, in order to determine whether the aircraft are collision hazards to each other, the computer shown in FIGURE 2 receives the data of the five parameters as indicated in FIGURE 1. The computer divides the values of these five parameters into a relatively small number of bands as indicated in the tables and in FIGURE 3 and then produces signals for each parameter which are indicative of the presence of a value in each of the bands. Then the computer combines several combinations of band signals which indicate a collision hazard, as indicated on the diagrammatic representation of FIGURE 3, in an AND gate so that if any of the hazard indicating combinations are present, the AND gate representing that combination will produce a signal which will actuate an alarm indicator and which may be utilized to provide additional information such as a bearing sector of a potential collision hazard. Thus, each one of fourteen AND gates, 101–114, shown in FIGURE 2, sense several combinations of parameter bands which are indicative of a collision hazard existing between two aircraft.

In order to facilitate the detailed description of FIGURE 2, the fourteen AND gates, 101–114, are tabulated in Table IV with the ranges of the parameters which combine to activate each one.

Table IV

| AND Gate | Bearing Sector | Relative Course Sector | Relative Velocity | Range | Relative Altitude |
|---|---|---|---|---|---|
| 101 | $B_6$ | $R_2$ | Any | $D_1$ and $D_2$ | |
| 102 | $B_6$ | $R_1$ | S | $D_1$ and $D_2$ | |
| 103 | $B_1$ | $R_3$ | Any | $D_1$ and $D_2$ | |
| 104 | $B_1$ | $R_4$ | S | $D_1$ and $D_2$ | |
| 105 | $B_5$ | $R_2$ | F or H | $D_1$ and $D_2$ | |
| 106 | $B_5$ | $R_1$ | S or F | $D_1$ (0–16 mi.) | |
| 107 | $B_5$ | $R_1$ | H | $D_1$ and $D_2$ | Within 700 ft. |
| 108 | $B_2$ | $R_3$ | F or H | $D_1$ and $D_2$ | |
| 109 | $B_2$ | $R_4$ | S or F | $D_1$ (0–16 mi.) | |
| 110 | $B_2$ | $R_4$ | H | $D_1$ and $D_2$ | |
| 111 | $B_4$ | $R_1$ | F or H | $D_1$ (0–16 mi.) | |
| 112 | $B_4$ | $R_1$ | H | $D_1$ and $D_2$ | |
| 113 | $B_3$ | $R_4$ | F or H | $D_1$ (0–16 mi.) | |
| 114 | $B_3$ | $R_4$ | H | $D_1$ and $D_2$ | |

In addition to the aforementioned bands which are set forth in Table IV, each AND gate must receive a signal indicative of the fact that the second aircraft being considered is within a hazardous close altitude of the first aircraft, which for the purposes of illustrating the present embodiment, has been chosen as 700 ft. above or below the first aircraft.

Referring now to FIGURE 2, a bearing indicator 70 is connected to the antenna drive unit 46 to receive the bearing of the directional antenna 44 as it continuously rotates. The bearing indicator 70 issues signals $B_1$ through $B_6$ sequentially as the antenna 44 rotates through the six bearing ranges or sectors. The bearing indicator 70 is connected to the fourteen AND gates 101–114 in order to place a binary one on the AND gates associated with a bearing sector whenever the direction of the antenna 44 is within that sector. A binary adder circuit 71 is connected to the encoder 21 to receive the binary code indicative of the course of the first aircraft and is connected to the course detector 48 to receive the binary code indicative to the course of a second aircraft. When a signal is received from the course detector 48, the binary encoded course in encoder 21 is read. The binary coded number transmitted from one aircraft to the other has added to it a binary 360° so that the heading transmitted is always 360° greater than the binary coded signal which is transmitted from the encoder 21 directly to the computer 50. Thus, when the adder subtracts the course of the first aircraft $C_1$ from the course of the second aircraft $C_2$, the result is the relative course in binary code. A relative course unit 72 is connected to the adder 71 to receive the binary code of the relative course between the second aircraft from the first aircraft and to determine which of four sectors, $R_1$–$R_4$, the relative course is within. This selection is carried out by conventional "greater than" and "less than" binary circuits in the relative course unit 72. These circuits cause one of four lines connected to the appropriate AND gates, as indicated in FIGURE 3 and in Table IV to go from binary zero to a binary one. This signal remains on for a period of time approximately equal to the transmission time of the ten bit encoded subcarrier pulse signals utilized in the system. Thus, when one of the bearing signals is being received by the appropriate AND gates, the same AND gates may also receive a binary one from the relative course unit 72. The relative course unit 72 maintains a binary on one of its outputs for a period approximately equal to the length of the transmitted information pulses carrying the ten bit binary code indicative of the altitude, course and velocity of a second aircraft. For example, if gate 105 is receiving a binary one from bearing indicator 70 and a binary one from relative course unit 72 indicating relative course sector $R_2$, it will be activated if it should also receive a relative velocity signal of binary one indicating a relative velocity (F or H) of the second aircraft faster than the first aircraft and a binary one indicating that the other aircraft is within 700 ft. in altitude.

For the purpose of determining relative velocities, a relative velocity unit 73 which contains conventional "greater than" and "less than" binary circuits is connected to velocity detector 49 to receive the binary signal which is indicative of the velocity of a second aircraft and connected to encoder 31 so that when a signal is received from the velocity detector 49, the binary encoded velocity contained in encoder 31 is read and compared with the binary signal received from velocity detector 49. When the two signals are compared, relative velocity unit 73 activates one of its three outputs by changing from a binary zero to a binary one in order to issue one of the velocity signals, S, F or H. FIGURE 2 shows that the three outputs are connected to the appropriate AND gates as indicated in Table IV. In order to facilitate the combining of the velocity bands S and F for placing a binary one on one of the inputs to AND gates 106 and 109, relative velocity unit 73 has output leads connected to an OR gate 74 which, in turn, is connected to an input terminal of an AND gate 75. AND gate 75 has another input terminal connected to an output terminal of a range counter unit 81. If a binary one is received from the OR gate 74 (S or F) and from the range counter unit 81 ($D_1$) indicating that the range of the second aircraft is between zero and sixteen miles, AND gate 75 issues a binary one at its output terminal which is connected to an input terminal of AND gates 106 and 109. The range counter unit is connected to the pulse generator 40 so that it receives a pulse T whenever the pulse generator triggers the RF oscillator 41. When the range counter unit 81 receives the signal T, a multivibrator electronic clock commences to count time which is equivalent to range and issues a signal indicative of a range between zero and sixteen miles $D_1$ until sufficient time has elapsed for a transmitted interrogation signal to reach all other aircraft within the range of sixteen miles and have a transmitted reply signal returned to the first aircraft. The counter also issues a $D_2$ signal while the elapsed time is between the two-way travel time to aircraft between sixteen and thirty-six miles distance from the first aircraft. In the embodiment of the invention shown in FIGURE 2, the determination of the $D_2$ signal is utilized to prevent aircraft over a distance of thirty-six miles from being considered as navigational hazards as will be presently described.

The output terminals which carry the F and H signals from the relative velocity unit 73 are connected to input terminals of an OR gate 76, whose output terminal is connected, in turn, to AND gates 105 and 108. The gates 105 and 108 are, as shown in Table IV, the two AND gates which are activated whenever the velocity of the second aircraft is greater than the speed of the first aircraft regardless of the distance between the aircraft. On the other hand, AND gates 111 and 113 are to be activated whenever the velocity of the second aircraft is greater than the velocity of the first aircraft and the distance between the two aircraft is less than sixteen miles. Therefore, to combine the F or H signals with a $D_1$ signal from the range counter unit 81, the output of the range counter unit 81 is connected to an input terminal of an AND gate 77, and an output terminal of the OR gate 76 is connected to another terminal which is the only other input terminal of AND gate 77. Therefore, when a binary one is received from the relative velocity unit 73 through OR gate 76 and a binary one is received from the range counter unit 81 indicating that the distance is $D_1$ (less than sixteen miles), the AND gate 77 issues a binary one on an output terminal which is connected to an input terminal of AND gate 111 and to an input terminal of AND gate 113.

Four of the AND gates, as indicated in Table IV, are to be activated only when the relative velocity unit 73 is issuing an H signal to each of them. Therefore, the output terminal provided for the H signal is connected directly to an input terminal of AND gates 107, 110, 112 and 114. The relative velocity unit 73 having determined the relative speed between the second aircraft and the first aircraft, maintains a binary one on one of its output terminals to issue either the S, F or H signals for a period of time which is approximately equal to the length of the transmitted information pulses carrying the ten bit binary code indicative of the altitude, course and velocity of the second aircraft.

Since the AND gates 101-114 are to be activated only if the second aircraft is within 700 ft. of the first aircraft, an altitude unit 78 is connected to altitude detector 47 for receiving the binary code indicative of the altitude of the second aircraft and to encoder 11 for reading the altitude of the first aircraft from the encoder 11 when an altitude encoded signal is received from altitude detector 47. The altitude unit 78 substracts by conventional binary adder circuitry the altitudes from each other and passes a binary coded signal indicative of the difference of the two altitudes through a "less than 700 ft. circuit" which is utilized to actuate the output of the altitude unit 78 from a binary zero to a binary one whenever the altitude difference is less than 700 ft. The altitude unit 78 retains the binary one on its output for a period approximately equal to the ten bit data transmission pulses as does relative course unit 72 and relative velocity unit 73. The output terminal of altitude unit 78 is connected to an input terminal of each one of the AND gates 101-114 through an AND gate 79 so that none of the AND gates will be activated unless the altitude between the two aircraft being considered is less than 700 ft. and the range is less than thirty-six miles ($D_1$ or $D_2$).

The range counter unit 81 combines the $D_1$ or $D_2$ signals into a $D_L$ signal on an output terminal which is connected to an input terminal of AND gate 79. As long as the range is within the limit beyond which no aircraft are to be considered a hazard, range counter issues a binary one to AND gate 79. As soon as the elapsed time for reply signals to a transmitted interrogation signal has exceeded the time for relay signals to be received from aircraft within the limit, AND gate 79 receives a binary zero from range counter unit 81. Combining the $D_L$ signal and the less than 700 ft. signal in AND gate 79 reduces the number of inputs which would otherwise be required on AND gates 101-114.

The circuitry of FIGURE 2 thus far described provides an output signal at the output terminal of each of the AND gates 101 to 114 when a possible collision hazard exists. Whenever information is received from another aircraft, some of the input terminals of the AND gates will receive binary ones, but they cannot issue binary ones on their output terminals unless all of the signals set forth in Table IV are received on their respective inputs.

In order to provide an indication of the bearing sector of another aircraft which is a hazard, a series of six OR gates 115-120 have their input terminals connected to the output terminals of the AND gates 101-114. Each OR gate has its input terminal connected to the respective output terminals of the AND gates which correspond to one of the six bearing sectors. Thus, OR gate 115 has its input terminals connected to the output terminals of AND gates 101 and 102 so that it will issue a binary one only when either 101 or 102 is issuing a binary one at its output terminal. In like manner, the input terminals of OR gate 116 are connected to the output terminals of AND gates 103 and 104; OR gate 117 has its input terminals connected to the output terminals of AND gates 105, 106 and 107; OR gate 118 has its input terminals connected to the output terminals of AND gates 108, 109 and 110; OR gate 119 has its input terminals connected to the output terminals of AND gates 111 and 112; and OR gate 120 has its input terminals connected to the output terminals of AND gates 113 and 114. Each one of the OR gates 115-120 is connected to one of a set of six multivibrators 121-126, respectively, which are "set" when the respective OR gate issues a binary one. Each of the multivibrators is connected to indicator lamps 127-132, respectively, which are lit when the respective multivibrator is in its "set" position.

Referring now to FIGURE 4, the indicator 133, which is mounted in a standard 3¼ inch aircraft instrument panel case, has indicator lamps 127-132 respectively placed behind translucent bearing sectors 227-232 to indicate to the pilot the bearing sectors which contain a possible collision hazard so that he has an approximate position warning indicator of all hazards displayed to him.

Although the display on panel 133 indicates the general relative bearing of a second aircraft which is a hazard to the first so that the pilot may visually locate such an aircraft under visual flight rule conditions and thereby avoid a mid-air collision, the display of relative bearing will not be satisfactory for aircraft which are operated from time to time under instrument flight rules. When operated under instrument flight rules, a collision prevention device must be of the collision avoidance system type wherein a signal is issued directing a procedure for the pilot to follow which will avert a potential collision between two aircraft. To provide this capability, the output terminals of the OR gates 115-120 are also connected to an OR gate 134, which has an output terminal connected to an input terminal of an AND gate 135 and an AND gate 136. An avoidance command unit 80 is connected to altitude detector 47 and to encoder 11 so that it may receive the binary code indicative of the altitude of the second aircraft and the binary code indicative of the altitude of the first aircraft in order to determine through conventional binary code "greater than" and "less than" circuits, whether the second aircraft is above or below the first aircraft. If the second aircraft has an altitude slightly below the first aircraft, the avoidance command unit will issue an up signal U at an output terminal which is connected to an input terminal of AND gate 135. When the up signal is issued, this input terminal goes from a binary zero to a binary one. In like manner, an output terminal of the avoidance command unit 80 is connected to the input terminal of the AND gate 136 to issue a binary one as a down signal D when the second aircraft is slightly above the first aircraft. Thus, the collision maneuver that is to be dictated by the present invention is a climb or a dive maneuver in order to get out of approximately the same altitude occupied by the hazard. Gate 135 will receive binary one on both its inputs if a potential collision hazard exists and if the other aircraft is slightly below the first aircraft, to issue a binary one at an output terminal which is connected to a set terminal of a multivibrator 137. In like manner, a binary one on both inputs of AND gate 136 indicates that the potential collision hazard exists and that it is slightly above the first aircraft. When both input terminals of AND gate 136 are at binary one, it issues a binary one at an output terminal which is connected to a set terminal of a multivibrator 138. These multivibrators are connected to lamps 139 and 140, respectively, which are lit when the associated multivibrator is "set." Referring to FIGURE 4, these lamps are set behind translucent panels so that the arrow 141 and the word "CLIMB" are illuminated when the lamp 139 is lit and the arrow 142 and the word "DIVE" are illuminated when the lamp 140 is lit. Thus, the embodiment of the invention described satisfies the requirement of both a pilot warning instrument and a collision avoidance system wherein the relative bearing sector of a hazard and the collision avoidance procedure that will avoid a collision are both indicated to a pilot.

A reset terminal of each of the bistable multivibrators 121–126, 137 and 138 is connected to the pulse generator 40 to reset the multivibrators and thereby extinguish any of the lamps 127–132, 139 and 140, which might be lit from the previous cycle of operation when the pulse T is issued.

While the computer illustrated in FIGURE 2 takes advantage of all five parameters in evaluating the possibility of the two aircraft being a collision hazard to each other, the present system provides for the utilization of collision hazard computers which utilize less than all five of the parameters. Some of these computers, which are part of the present invention, will be described by specifically pointing out the elements of the computer illustrated in FIGURE 2 which can be eliminated to make an even less complex computer for smaller and lower performance aircraft. The elimination of elements from the computer shown in FIGURE 2, while making an even less complex computer, does so by at least a small sacrifice of the accuracy possessed by the computer illustrated in FIGURE 2. Considering first a second computer which utilizes the relative altitudes, relative courses, relative velocities, and the bearing of one aircraft to the other, but not the range between the two aircraft, it can be built similarly to the one illustrated in FIGURE 2 with the range counter unit 81 and the AND gates 75 and 77 eliminated. When these elements have been eliminated, AND gate 107, which is one of the two AND gates corresponding to bearing sector $B_5$ and relative course sector $R_1$, can be eliminated, and the input terminal to AND gate 106 from eliminated gate 75 can be removed so that there remains a single AND gate for utilization with bearing sector $B_5$ and relative course sector $R_1$ which will be indicative of a hazardous situation regardless of the relative velocity of two aircraft. This would correspond to diagrammatically making the three arcs of bearing sector $B_5$ and relative course sector $R_1$ solid instead of having the two inner ones dotted, as shown in FIGURE 3. In like manner, the corresponding AND gate 110 can be eliminated, and the input terminal of gate 109, formerly connected to gate 75, can be removed leaving only gate 109 for sector $B_2$ and relative course sector $R_4$. AND gates 112 and 114 can be eliminated, leaving only the gates 111 and 113 for sectors $B_3$ and $B_4$, which then should have their input terminals from the relative velocity vector unit connected to the output of OR gate 76 so they will now indicate a collision hazard whenever the velocity of the second aircraft exceeds the velocity of the first aircraft. Since this leaves only one AND gate connected to OR gates 119 and 120, respectively, these OR gates can be removed, and the AND gates connected directly to the bistable multivibrators 125 and 126 and to the input terminals of OR gate 134 directly. In each situation, where there is no connection between the relative velocity unit 73 and an AND gate, that AND gate represents the existence of a collision hazard regardless which band of velocities is present. Therefore, in effect, it is the same as if it was receiving a relative velocity unit signal from any one of the three outputs through an OR gate. It will be recognized by those skilled in the art that, by the elimination of the gates relating to range determination, the number of situations, which would not actually lead to a collision, that are now considered within the realm of those which could possibly cause a collision, has risen and therefore, the number of actual false indications presented by the panel 133 will rise slightly. However, the computer utilizing only these four parameters, instead of all five, is simpler and less complex.

Referring now to FIGURE 5, a third computer is schematically illustrated which is suitable for use as the computer 50 in the collision avoidance device shown in FIGURE 1. This computer is similar to the one illustrated in FIGURE 2 with the exception that the utilization of relative velocities is eliminated. Thus, the relative velocity unit, such as 73 in FIGURE 2, is not shown in FIGURE 5. The computer shown in FIGURE 5 utilizes the four parameters of relative bearing, relative courses, range between aircraft, and relative altitudes in making a determination that one aircraft is a hazard to the other. Since many of the components utilized in the computer shown in FIGURE 5 are similar and perform the same or similar functions as they do in the computer shown in FIGURE 2, the components in FIGURE 5 have similar numbers to the components in FIGURE 2, with the addition of a suffix "a." Referring to FIGURE 3, it will be seen that by eliminating relative velocities as one of the parameters available for making the decision as to whether one aircraft is a hazard to the other aircraft or not, that each 90° relative course sector surrounding the representation of a second aircraft 61–66 in each one of the bearing sectors $B_1$–$B_6$ represents a combination of two parameters whose bands of values must be compared to decide whether a hazardous situation exists. Since there are ten of these 90° arcs which have heavy lines shown indicating that the combination of the bearing sector and the relative course sector should be treated as a potential hazard at at least one relative speed, ten AND gates must be provided in the computer shown in FIGURE 3 to indicate the presence of any one of these ten combinations. FIGURE 5 shows that ten AND gates are provided for this purpose. They are 101a–106a, 108a, 109a, 111a and 113a. These gates are connected, as shown in FIGURE 5 and as indicated in a Table V.

*Table V*

| AND Gate | Bearing Sector | Relative Course Sector | Range | Relative Altitude |
| --- | --- | --- | --- | --- |
| 101a | $B_6$ | $R_2$ | | |
| 102a | $B_6$ | $R_1$ | | |
| 103a | $B_1$ | $R_3$ | | |
| 104a | $B_1$ | $R_4$ | | |
| 105a | $B_5$ | $R_2$ | $D_L$ | <700' |
| 106a | $B_5$ | $R_1$ | | |
| 108a | $B_2$ | $R_3$ | | |
| 109a | $B_2$ | $R_4$ | | |
| 111a | $B_4$ | $R_1$ | | |
| 113a | $B_3$ | $R_4$ | | |

Referring to Table V, it will be noted that, of the four parameters, relative bearing and relative course sectors make the important decision once a second aircraft is within 700 ft. of the same altitude as the first aircraft and the range between the aircraft is less than a predetermined limit. Thus, it is only necessary to make it possible to activate the ten AND gates listed in Table V when the relative altitudes and the distances satisfy the predetermined limits. In order to activate the ten AND gates, a binary one is placed on one input terminal of each and every one of the ten AND gates. The distance and relative altitude conditions are satisfied by having an input terminal of each one of the ten AND gates connected to an output terminal of an AND gate 79a, which has one input connected to a range counter unit 81a to receive a binary one as long as the received signals from the second aircraft indicate it is within a predetermined range and another input connected to an altitude unit 78a to receive a binary one as long as the altitudes of the two aircraft are within 700 ft. of each other. Thus, the production of a $D_L$ signal by the range counter unit 81a, a less than 700 ft. signal, a relative altitude unit indication by altitude unit 78a, which are combined by AND gate 79a, and the activations of the ten AND gates by 79a is the same operation of such components as was illustrated and described for the computer shown in FIGURE 2. In like manner, the components of FIGURE 5, which are indicated as being similar to the components shown in FIGURE 2, have the same structure and functions as those in FIGURE 2. The primary difference between the computer shown in FIGURE 5 from the computer shown in FIGURE 2 is the number of AND gates required. Since there is no decision to be made based upon relative speed, one AND gate of FIGURE 2 which is involved with each of the bearing sectors $B_2$, $B_3$, $B_4$ and $B_5$ is eliminated. With the removal of relative velocity input signal, two of the AND gates of the computer shown in FIGURE 2 associated with each of these four sectors would provide the exact same function, and therefore, are superfluous. With this elimination, the AND gates associated with bearing sectors $B_4$ and $B_3$ are reduced to single AND gates, making it unnecessary to have an OR gate before connecting them directly to a bistable multivibrator. Therefore, the AND gates 111a and 113a are connected directly to a bistable multivibrator 125a and a bistable multivibrator 126a. Since the computer in FIGURE 5 contains corresponding indicator lamps 127a–132a, 139a and 140a, the indicator illustrated in FIGURE 4 may be utilized with the computer illustrated in FIGURE 5.

Referring now to a fourth computer illustrated in FIGURE 6, which is suitable for the use as the computer 50 in the equipment indicated in FIGURE 1, it utilizes three, instead of four or all five of the parameters available in deciding whether one aircraft is a hazard to the other. FIGURE 3 shows that with the elimination of both relative velocities and relative courses, the mere presence of a second aircraft indicated by the small aircraft symbols 61–66 in a sector within the preselected altitude and distance limits must be computed as being a hazard. This situation is indicated in a Table VI.

*Table VI*

| AND Gates | Bearing Sector | Distance | Relative Altitude |
|---|---|---|---|
| 101b | $B_6$ | $D_L$ | <700' |
| 103b | $B_1$ | | |
| 105b | $B_5$ | | |
| 108b | $B_2$ | | |
| 111b | $B_4$ | | |
| 113b | $B_3$ | | |

As shown by the table, only six AND gates are required in addition to signals indicating that the distance and the relative altitudes are within the predetermined limits. This computer is illustrated in FIGURE 6 and consists of components including the six AND gates listed in Table VI which bear similar numerals to the units of the computer shown in FIGURES 2 and 5 with the suffix "b." As in the previously described computers, the limits of operations are combined by utilization of a single AND gate 79b, whose output is connected to an input of each of the six AND gates associated with the bearing sectors. Each of these AND gates 101b, 103b, 105b, 108b, 111b and 113b have a second input terminal connected to a bearing indicator 70b to receive the respective bearing sector signals. Since this computer has a set of indicator lights 127b–132b, 139b and 140b, similar to the indicator lights as those utilized in the previously described computer, and since similarly numbered components shown in FIGURE 6 perform the same functions as the similarly numbered components in FIGURE 2, the indicator shown in FIGURE 4 and previously described may be utilized as the output indicator for this computer.

Referring again to FIGURE 5, a fifth computer suitable for utilization as computer 50 in FIGURE 1 will be described. Since the parameter of range between the aircraft is utilized in the circuit shown in FIGURE 5 only to provide a distance limiting signal which prevents all aircraft beyond a predetermined range from the first aircraft, it is to be computed as non-hazards. Therefore, the fifth computer is similar to the third shown in FIGURE 5 in that it utilizes relative bearing, relative course and relative altitude in determining whether a collision hazard exists. It does not utilize a range counter unit to determine range. The fifth computer, in eliminating consideration of distance between the aircraft, relies upon the atmospheric and space attenuation of the radiated signals to prevent an excessive number of replies from very distant aircraft from being received and computed. Therefore, the fifth computer has the same components and circuits as shown in FIGURE 5, with the exception that no range counter unit 76a and no AND gate 79a are provided. An altitude unit such as 78a is connected directly to an input terminal of each one of ten AND gates 101a–106a, 108a, 109a, 111a and 113a. Thus, the functioning of this fifth computer is the same as the third computer except that it will continue to compute data from aircraft at all ranges that are not too great for a reply signal to be received by antenna 44 and to be modulated by the detectors 47–49. Once again, the indicator shown in FIGURE 4 may be utilized as the collision avoidance indicator for both a pilot warning instrument or a collision avoidance system presentation. Table V represents the combination of parameter bands which this fifth computer utilizes if the range parameter column is eliminated from the table.

Referring now to FIGURE 6 and Table VI, a sixth computer utilizing only the parameters of relative bearing and relative altitude will be described. This sixth computer is the same as the fourth computer shown in FIGURE 6 if the range counter unit 81b and the AND gate 79b were eliminated so that an altitude unit 78b is directly connected to the set of six AND gates 101b, 103b, 105b, 108b, 111b and 113b. Thus, this sixth computer is similar to the fourth computer in all respects except it will continue computing hazardous situations for all aircraft which are close enough to produce a detectable signal at the detectors 47–49. If the distance column is eliminated from Table VI, the bands of the two parameters utilized in this sixth computer which combine to indicate a hazardous situation are shown. Thus, a second aircraft within 700 ft. of the altitude of the first, in effect, is computed as a hazard regardless of its range. However, the relative bearing determination and the altitude determination provide a combined pilot warning instrument and collision warning system display on an indicator as shown in FIGURE 4.

Referring now to FIGURE 7, a seventh computer suitable for use as computer 50 in FIGURE 1 utilizes the three parameters of relative velocity, range between aircraft and relative altitudes in determining whether one aircraft is a hazard to another. This computer utilizes the criterion that, for two aircraft to be a hazard to each other, they must approach each other in one manner or another. The hazard arises at a time when the combination of the diminishing range and the relative velocities reach a point that the two aircraft, if traveling on the most direct head-on routes, would reach each other in a length of time which would be just slightly greater than the time required to compute the problem and for a pilot or an automatic pilot to accomplish sufficient evasive action such as a climb or a dive out of the altitude of the other craft. Thus, as the combined aircraft speeds increase, the range at which a hazardous situation must be declared increases. As the speeds of aircraft decrease, the range at which a hazardous situation must be declared decreases. Therefore, the seventh computer is designed to divide range from the first aircraft into three ranges denoted by $D_1$, $D_2$ and $D_3$ and to divide the relative velocities into three ranges of S, F and H, as was done in the design of the first computer shown in FIGURE 2. The combination of relative velocities, ranges between aircraft and relative altitude which the seventh computer computes as hazardous situations are set forth in Table VII below.

*Table VII*

| AND Gate | Range | Relative Velocity Ranges | Relative Altitude |
|---|---|---|---|
| 141 | $D_1$ (0–5 mi.) | S, F, H | |
| 142 | $D_2$ (5–10 mi.) | F, H | <700′ |
| 143 | $D_3$ (15–20 mi.) | H | |

The relative velocity unit 73c operates in the same manner as relative velocity unit 73 and the altitude unit 78c operates in the same manner as altitude unit 78. The range counter unit 81c is similar to the range counter unit 81 in that it produces a $D_1$ and a $D_L$ signal, as does unit 81. However, it includes additional delay multivibrator circuits which make it capable of issuing $D_2$ and $D_3$ signals in addition to the $D_1$ and $D_L$ signals as listed in Table VII. In order to combine the $D_1$ signal with either the S, F or H signals from relative velocity unit 73c, an OR gate 76c, which is similar to gate 76 in FIGURE 2, combines the F and H signals and an OR gate 74c, in turn, combines the F and H signals with the S signal. An output terminal of gate 74c is connected to an input terminal of an AND gate 141. A second terminal of gate 141 is connected to range counter unit 81c to receive the $D_1$ signal which is a binary one and a third input terminal is connected through AND gate 79c to the range counter unit 81c and to the altitude unit 78c so that a binary one is placed on the input terminal as long as the range between aircraft is within the range limit and the relative altitudes place the aircraft within the altitude limit of 700 ft. In a similar manner, an AND gate 142 has an input terminal connected to the output of an OR gate 76c to receive either the F or H relative velocity signals. It has a second input terminal connected to the range computer unit 81c to receive the $D_2$ range signal. It also has a third input terminal connected to AND gate 79c to receive the combined range and altitude limit signals. An AND gate 143 has an input terminal connected to relative velocity unit 73c to receive the H signal, a second input terminal connected to the range counter unit 81c to receive the $D_3$ signal, and a third input terminal connected to the output terminal of AND gate 79c to receive the range and altitude limit signals. The AND gates 141–143 are connected to a set input terminal of bistable multivibrators 144–146, respectively. A set output terminal of these three multivibrators is connected to one of a set of lamps 147–149 respectively and to an input terminal of an OR gate 134c. A reset input terminal of each of the multivibrators 144–146 is connected to the pulse generator 40 to receive the trigger signal T. When the trigger signal T is received, each of the multivibrators is reset, thereby turning off any of the lamps 147–149 which may have been lit. The lamps 147–149 are utilized to illuminate translucent rings 171–173, respectively, on an indicator 170 shown in FIGURE 10. Indicator 170 is mounted in a standard 3¼ inch aircraft instrument panel case. Although the presentation of this indicator cannot tell the pilot the approximate bearing of a hazard, it does tell him the approximate range of the hazard. The OR gate 134c, AND gates 135c and 136c, avoidance command unit 80c, bistable multivibrators 137c and 138c, lamps 139c and 140c, and arrows 141c and 142c perform the same functions of providing a collision avoidance system display as do the similarly numbered components in FIGURES 2 and 3. The lamps 139c and 140c illuminate the arrows 141c and 142c and the words "CLIMB" and DIVE" shown in FIGURE 10.

Referring now to FIGURE 8, an eighth computer, which utilizes only the two parameters of range between the aircraft and relative altitudes suitable for use as computer 50 in FIGURE 1, is illustrated. It contains components similar to those in the computer of FIGURE 2 and FIGURE 7, as well as others of the aforementioned computers. These components are therefore numbered with numerals similar to the components which perform the same function in the other computers. They differ in that they have a suffix "d." It may be noted that this eighth computer has the components necessary to provide collision avoidance display found in similar computers, but that there is no bank of decision-making AND gates required. An AND gate 79d performs the only decision to be made in this computer, which is whether the distance between aircraft and the relative altitudes of the aircraft are within limits. Therefore, two input terminals of AND gate 79d are connected to receive a binary one from a range computer unit 81d as the $D_L$ signal and a binary one from the altitude unit 78d as the less than 700 ft. signal. Since AND gate 79d is the only decision-making gate, its output is connected directly to AND gates 135d and 136d and to a set terminal of a bistable multivibrator 150. A set output terminal of bistable multivibrator 150 is connected to a lamp 151 to light it when the multivibrator is set. Since the lamp 151 is lit whenever lamp 139d or lamp 140d are lit, it could be eliminated as part of the display for this eighth computer. A suitable display would be that shown in FIGURE 10 without the distance ranges shown thereon. Lamp 151 could be used as a general alarm light at any convenient place in an indicator or at a suitable location in the cockpit of an aircraft. A reset terminal of the bistable multivibrator 150 is connected to the pulse generator 40 so that it is reset when a new interrogation pulse is sent out by the antenna 43.

If the range computer unit 81d has been made identical to the range computer unit 81c, shown in FIGURE 7, the output signals of $D_1$, $D_2$ and $D_3$ could be utilized to trigger bistable multivibrators to light a set of lights such as 147–149. Then the complete indicator, as shown in FIGURE 10, could be utilized with the two parameter type computers shown in FIGURE 2. Such modifications are within the scope of the present invention.

Referring now to FIGURE 9, a computer of differing components than those generally found in the eight computers thus far described, is illustrated. This ninth computer utilizes the four parameters of relative velocity, relative course, relative bearing and relative altitude to determine whether one aircraft is a hazard to another. The only components utilized in this computer, which are similar in structure and function to those found in the aforementioned computers, are shown within a dashed line 152 and are similarly numbered with a suffix of "e" to indicate that their structure and function are similar to the corresponding components in the aforementioned eight computers. A conventional binary adder 160, which is wired to perform subtraction, is connected to antenna drive unit 46 to receive a bearing signal B indicative of the relative bearing of an aircraft from which a signal is being received and to encoder 21 to receive the first aircraft's course signal $C_1$ whenever a signal from a second aircraft is received through antenna 44. An adder 161, connected as a subtractor, is connected to antenna drive unit 46 to receive the bearing signal B and to course detector 48 to receive a course signal $C_2$ of a second aircraft. The adders 160 and 161 may be of any conventional subtracting circuit which produces binary coded signals $B_1$ and $B_2$. The $B_1$ signal represents the relative bearing of the second aircraft from the first aircraft, and the $B_2$ signal represents the bearing of the first aircraft from the second aircraft, as shown diagrammatically in FIGURE 11. The outputs of the adders 160 and 161 are connected to conventional binary sine converters 162 and 163, respectively, whose circuits may be of any conventional binary design. The sine converters issue the sine of the angle $B_1$ and $B_2$ to a pair of binary multipliers 164 and 165, respectively. The multiplier 164 is connected to encoder 31 so that it is capable of reading the binary indication of the velocity of the first aircraft at the time a signal is received from the sine converter 162, and multiplier 165 is connected to the velocity detector 49 so that it is capable of receiving a binary signal indicative of the velocity of the second aircraft. By conventional binary multiplier circuitry, multiplier 164 produces a binary signal representing the component of the first aircraft velocity vector perpendicular to line of sight between the two aircraft $V_1 \sin B_1$, as shown in FIGURE 11. In like manner, multiplier 165 produces a binary signal indicative of a component of the velocity vector of the second aircraft $V_2 \sin B_2$. The multipliers 164 and 165 are connected to an adder 166 which is wired as a subtracter in order to produce a binary signal to a binary comparator 167 which is indicative of the difference between the velocity vector component $V_1 \sin B_1$ and velocity vector component $V_2 \sin B_2$. The comparator 167 consists of a conventional "less than" binary circuit which determines whether the binary signal indicative of the difference between the components is less than a predetermined value, as for example, 50 knots. When the comparator 167 receives the binary signal which is indicative of a quantity less than the preselected value, it issues a binary one signal which is herein referred to as a warning signal W. Thus, the portion of the ninth computer shown in FIGURE 9 outside the dashed line 152 computes whether the relative bearing between the two aircraft will remain dangerously constant if the two aircraft remain on their present courses at their present speeds and altitudes. As is well known in the collision prevention art, a steady bearing between two aircraft or a relative bearing rate of zero is an indication that the two aircraft will eventually collide unless they have already passed each other. A steady bearing rate is produced by the fact that the components of the velocities of two aircraft perpendicular to the line of sight between the two aircraft are equal. If aircraft had no physical size, being only points, it might be practical to say that any time the velocity vector components perpendicular to their line of sight were not exactly equal, there was no danger of a collision. However, all aircraft are finite in size and produce a turbulent wake. Therefore, a reasonable safety area around each craft should be provided. It is desirable to have the components of the two aircraft perpendicular to the line of sight between them sufficiently large to assume that the bearing of one aircraft to the other will change rapidly enough that they will pass at a safe minimum distance from each other. Therefore, a preselected value of 50 knots might be selected. Then, at any time the velocity vectors of two aircraft fall within 50 knots of each other, the aircraft are declared to be hazardous to each other by the computer.

Since the comparator 167 is connected to an input terminal of AND gate 79e, an alarm is produced only when the altitudes of the two aircraft being considered are within the predetermined value of 700 ft. of each other. Since a warning light 151e and warning lights 139e and 140e are provided, an indicator such as that described for use with the eighth computer and shown in the center of FIGURE 10 is suitable for use with this computer. If it were desired, a range counter unit such as 81 could be added to the ninth computer to produce a range limit signal $D_L$ to a suitable AND gate such as 79e, so that a hazard would be indicated only if the two aircraft are within a predetermined limiting distance of each other. Such modifications are intended to be within the scope of the present invention.

A complete collision avoidance system for a multiplicity of aircraft in accordance with my invention, consists of a "minimum station" or transmitter section, shown in FIGURE 1, being carried by each aircraft of a multiplicity of aircraft with one or more of the aircraft carrying a receiver section, as shown in FIGURE 1, with a computer which utilizes two or more of the five aforementioned parameters to compute whether two of the aircraft are a collision hazard to each other. The computer utilized by one or more of the multiplicity of aircraft should be of such complexity as will afford sufficient information for that aircraft to avoid all other aircraft of the multiplicity of aircraft having equal or lower performance capabilities and yet be as small and economical in cost as the minimum required complexity will allow. Thus, the complexity of the computer, and therefore, of the entire equipment carried by an aircraft, may be tailored to the size and performance of each individual aircraft. Not only may the number of parameters utilized in computing the collision hazard problem be varied from aircraft to aircraft, but if a computer of a type of the first eight aforementioned computers is utilized, the sizes of the bands of the parameter values may also be varied greatly. As the bands of values are made smaller, the possibility of a non-collision situation being computed as a hazardous situation will be reduced, but the amount of circuitry required will be proportionately increased. In addition, computer systems such as shown in the ninth example, may be utilized with any of the aircraft of said multiplicity of aircraft, rather than a computer which utilizes the relatively large bands of values of a parameter as if it were a single value. If it were decided that a given multiplicity of aircraft were to use computers which did not utilize one or more of the three parameters of relative courses, relative velocities and relative altitudes, the information-producing instrument, its associated encoder and modulator can be eliminated from the transmitter section and the associated detector in the receiving section could be eliminated to further reduce the complexity of the transmitting and receiving sections. Also, whenever one of these parameters is not needed in a particular computer installed in an aircraft, the detector associated with the parameter which is not required should also be eliminated from the receiver section. Therefore, for the first time, a collision avoidance system is provided which will have the installation in each aircraft tailored to the size, performance, and requirement for collision avoidance information needed by that aircraft.

The present system is equally well adapted to surface craft with the altitude components being eliminated from both the transmitter and receiver sections. Although aircraft have been utilized throughout the description of the embodiment, it is intended that the system shall be utilized with both surface and space craft.

While there has been shown and described what are at present considered to be the preferred embodiments of the present invention, it will be obvious to those skilled in the art that various changes and modifications may be made therein without departing from the true scope of the invention. For example, the selection of the ranges of values of the parameters and the selection of the parameters themselves should vary markedly for surface craft, space craft, and aircraft of different capabilities. Such variations are within the scope of the present invention, a best embodiment as presently known being described for utilization of each combination of usable parameters. It is, accordingly, intended in the appended claims to cover all such changes and modifications as fall within the true scope of the invention and outside of the prior art.

In applying the appended claims to surface craft, the type of signals reserved for transmission between surface craft are of themselves indicative of the surface altitude and this fact is inherently utilized in determining the existence of a collision hazard situation.

I claim:

1. A system for indicating the presence of a navigational hazard comprising:
  a transmitter adapted to be carried by a first craft for generating signals having characteristics indicative of the altitude, course and velocity of said craft,
  a receiver carried by said craft for receiving other signals transmitted from a second craft and having characteristics indicative of the altitude and course of said second craft,
  a directional receiver means for indicating the relative bearing of said second craft, and
  means utilizing the signals having characteristics limited to the altitudes and courses of said first and second craft and utilizing said directional receiver means to indicate whether said second craft is a navigational hazard to the first craft, said means requiring no other inputs to determine when said second craft is a navigational hazard to the first craft.

2. A system for indicating the presence of a navigational hazard comprising:
  a transmitter adapted to be carried by a first craft for generating signals having characteristics indicative of the altitude, course and velocity of said craft,
  a receiver carried by said craft for receiving another signal transmitted from a second craft and having a characteristic indicative of the altitude of said second craft,
  a directional receiver means for indicating the relative bearing of said second craft, and
  means utilizing the signals having characteristics limited to the altitudes of said first and second craft and utilizing said directional receiver means to indicate whether said second craft is a navigational hazard to the first craft, said means requiring no other inputs to determine when said second craft is a navigational hazard to the first craft.

3. A system for indicating the presence of a navigational hazard comprising:
  a transmitter adapted to be carried by a first craft for generating signals having characteristics indicative of only the altitude and course of said craft,
  a receiver carried by said craft for receiving other signals transmitted from a second craft and having characteristics indicative of the altitude and course of said second craft,
  a directional receiver means for indicating the relative bearing of said second craft, and
  means utilizing said altitude signals for determining whether the altitude of the second craft is within a selected range of the altitude of the first craft,
  means utilizing said indicated relative bearing of said second craft for determining that said second craft is in one of a set of relative bearing sectors from said first craft,
  means utilizing said course signals for determining whether a course of said second craft is within a preselected range of courses relative to the course of said first craft, and
  means for indicating that said second craft is a navigational hazard to said first craft connected to said altitude determining means, to said bearing sector determining means and to said course determining means for actuation when the second craft altitude is within the preselected range of the first craft altitude, the second craft is in said one relative bearing sector and the second craft course is within the preselected range of the first craft course.

4. A system for indicating the presence of a navigational hazard comprising:
  a transmitter adapted to be carried by a first craft for generating signals having characteristics indicative of only the altitude and course of said craft,
  a receiver carried by said craft for receiving another signal transmitted from a second craft and having a characteristic indicative of the altitude of said second craft,
  a directional receiver means for indicating the relative bearing of said second craft, and
  means utilizing the signals having characteristics limited to the altitudes of said first and second craft and utilizing said directional receiver means to indicate whether said second craft is a navigational hazard to the first craft, said means requiring no other inputs to determine when said second craft is a navigational hazard to the first craft.

5. A system for indicating the presence of a navigational hazard comprising:
  a transmitter adapted to be carried by a first craft for generating a signal having a characteristic indicative of only the altitude of said craft,
  a receiver carried by said craft for receiving another signal transmitted from a second craft and having a characteristic indicative of the altitude of said second craft,
  a directional receiver means for indicating the relative bearing of said second craft, and
  computer means utilizing both signals and said directional receiver means to indicate whether said second craft is a navigational hazard to the first craft, said means requiring no other inputs to determine when said second craft is a navigational hazard to the first craft.

6. A system for indicating the presence of a navigational hazard comprising:
  a transmitter adapted to be carried by a first craft for generating signals having characteristics indicative of the altitude, course and velocity of said craft,
  a receiver carried by said craft for receiving other signals transmitted from a second craft and having characteristics indicative of the altitude, course and velocity of said second craft,
  range measuring means carried by said first craft for determining the range of said second craft,
  a directional receiver means for indicating the relative bearing of said second craft, and
  means utilizing said signals, said range measuring means and said directional receiver means to indicate whether said second craft is a navigational hazard to the first craft.

7. A system for indicating the presence of a navigational hazard comprising:
  a transmitter adapted to be carried by a first craft for generating signals having characteristics indicative of the altitude, course and velocity of said craft,
  a receiver carried by said craft for receiving other signals transmitted from a second craft and having characteristics indicative of the altitude and course of said second craft,
  range measuring means carried by said first craft for determining the range of said second craft,
  a directional receiver means for indicating the relative bearing of said second craft, and
  means utilizing the signals having characteristics limited to the altitudes and courses of said first and second craft, said range measuring means and said directional receiver means to indicate whether said second craft is a navigational hazard to the first craft, said means requiring no other inputs to determine when said second craft is a navigational hazard to the first craft.

8. A system for indicating the presence of a navigational hazard comprising:
a transmitter adapted to be carried by a first craft for generating signals having characteristics indicative of the altitude, course and velocity of said craft,
a receiver carried by said craft for receiving other signals transmitted from a second craft and having characteristics indicative of the altitude of said second craft,
range measuring means carried by said first craft for determining the range of said second craft,
a directional receiver means for indicating the relative bearing of said second craft, and
means utilizing the signals having characteristics limited to the altitudes of said first and second craft, said range measuring means and said directional receiver means to indicate whether said second craft is a navigational hazard to the first craft, said means requiring no other inputs to determine when said second craft is a navigational hazard to the first craft.

9. A system for indicating the presence of a navigational hazard comprising:
a transmitter adapted to be carried by a first craft for generating signals having characteristics indicative of only the altitude and course of said craft,
a receiver carried by said craft for receiving other signals transmitted from a second craft and having characteristics indicative of the altitude and course of said second craft,
range measuring means carried by said first craft for determining the range of said second craft,
a directional receiver means for indicating the relative bearing of said second craft, and
means utilizing said signals, said range measuring means and said directional receiver means to indicate whether said second craft is a navigational hazard to the first craft, said means requiring no other inputs to determine when said second craft is a navigational hazard to the first craft.

10. A system for indicating the presence of a navigational hazard comprising:
a transmitter adapted to be carried by a first craft for generating signals having characteristics indicative of only the altitude and course of said craft,
a receiver carried by said craft for receiving other signals transmitted from a second craft and having characteristics indicative of the altitude of said second craft,
range measuring means carried by said first craft for determining the range of said second craft,
a directional receiver means for indicating the relative bearing of said second craft, and
means utilizing the signals having characteristics limited to the altitudes of said first and second craft, said range measuring means and said directional receiver means to indicate whether said second craft is a navigational hazard to the first craft, said means requiring no other inputs to determine when said second craft is a navigational hazard to the first craft.

11. A system for indicating the presence of a navigational hazard comprising:
a transmitter adapted to be carried by a first craft for generating signals having characteristics indicative of only the altitude of said craft,
a receiver carried by said craft for receiving another signal transmitted from a second craft and having a characteristic indicative of the altitude of said second craft,
range measuring means carried by said first craft for determining the range of said second craft,
a directional receiver means for indicating the relative bearing of said second craft, and
computer means utilizing said signals, said range measuring means and said directional receiver means to indicate whether said second craft is a navigational hazard to the first craft, said means requiring no other inputs to determine when said second craft is a navigational hazard to the first craft.

12. A system for indicating the presence of a navigational hazard comprising:
a transmitter adapted to be carried by a first craft for generating signals having characteristics indicative of the altitude, course, and velocity of said craft,
a receiver carried by said craft for receiving another signal transmitted from a second craft and having a characteristic indicative of the altitude of said second craft,
range measuring means carried by said first craft for determining the range of said second craft, and
means utilizing the signals having characteristics limited to the altitudes of said first and second craft and said range measuring means to indicate whether said second craft is a navigational hazard to the first craft, said means requiring no other inputs to determine when said second craft is a navigational hazard to the first craft.

13. A system for indicating the presence of a navigational hazard comprising:
a transmitter adapted to be carried by a first craft for generating signals having characteristics indicative of the altitude, course and velocity of said craft,
a receiver carried by said craft for receiving other signals transmitted from a second craft and having characteristics indicative of the altitude and velocity of said second craft,
range measuring means carried by said first craft for determining the range of said second craft, and
means utilizing the signals having characteristics limited to the altitudes and velocities of said first and second craft and said range measuring means to indicate whether said second craft is a navigational hazard to the first craft, said means requiring no other inputs to determine when said second craft is a navigational hazard to the first craft.

14. A system for indicating the presence of a navigational hazard comprising:
a transmitter adapted to be carried by a first craft for generating signals having characteristics indicative of only the altitude and velocity of said craft,
a receiver carried by said craft for receiving other signals transmitted from a second craft and having characteristics indicative of only the altitude and velocity of said second craft,
range measuring means carried by said first craft for determining the range of said second craft, and
means utilizing said signals and said range measuring means to indicate whether said second craft is a navigational hazard to the first craft, said means requiring no other inputs to determine when said second craft is a navigational hazard to the first craft.

15. A system for indicating the presence of a navigational hazard comprising:
a transmitter adapted to be carried by a first craft for generating signals having characteristics indicative of only the altitude and velocity of said craft,
a receiver carried by said craft for receiving other signals transmitted from a second craft and having characteristics indicative of the altitude of said second craft,
range measuring means carried by said first craft for determining the range of said second craft, and
means utilizing the signals having characteristics limited to the altitudes of said first and second craft and said range measuring means to indicate whether said second craft is a navigational hazard to the first craft, said means requiring no other inputs to determine when said second craft is a navigational hazard to the first craft.

16. A system for indicating the presence of a navigational hazard comprising:
 a transmitter adapted to be carried by a first craft for generating signals having characteristics indicative of only the altitude of said craft,
 a receiver carried by said craft for receiving other signals transmitted from a second craft and having characteristics indicative of only the altitude of said second craft,
 range measuring means carried by said first craft for determining the range of said craft, and
 computer means utilizing said signals and said range measuring means to indicate whether said second craft is a navigational hazard to the first craft, said means requiring no other inputs to determine when said second craft is a navigational hazard to the first craft.

17. A system for indicating the presence of a navigational hazard comprising:
 a transmitter adapted to be carried by a first craft for generating signals having characteristics indicative of the altitude, course and velocity of said craft,
 a receiver carried by said craft for receiving other signals transmitted from a second craft and having characteristics indicative of the altitude, course and velocity of said second craft,
 a directional receiver means for indicating the relative bearing of said second craft, and
 electronic computing means utilizing said signals and said directional receiver means to indicate whether said second craft is a navigational hazard to the first craft, said computing means receiving indications of said characteristics of altitudes, courses and velocities and said relative bearing through circuits connected in parallel with each other to said computing means.

18. The method of indicating that a craft is a collision hazard to other craft comprising:
 transmitting signals from a first craft having characteristics indicative of its altitude, course and velocity,
 receiving said signals having characteristics indicative of the first craft's altitude and course on a second craft,
 generating signals on said second craft having characteristics indicative of its altitude and course,
 determining the bearing of the first craft from the second craft,
 utilizing only said signals having characteristics of the first craft's altitude and course and the second craft's altitude and course, and said bearing to determine whether one said craft is a hazard to the other, and
 receiving all said signals transmitted by said first craft at another location.

19. The method of indicating that a craft is a collision hazard to other craft comprising:
 transmitting signals from a first craft having characteristics indicative of its altitude, course and velocity,
 receiving said signal having characteristics indicative of the first craft's altitude on a second craft,
 generating a signal on said second craft having characteristics indicative of its altitude,
 determining the bearing of the first craft from the second craft, and
 utilizing only said signals having characteristics of the first craft's altitude and the second craft's altitude and said bearing to determine whether one said craft is a hazard to the other, and
 receiving all said signals transmitted by said first craft at another location.

20. The method of indicating that a craft is a collision hazard to other craft comprising:
 transmitting signals from a first craft having characteristics indicative of its altitude and course,
 receiving said signals having characteristics indicative of the first craft's altitude and course on a second craft,
 generating signals on said second craft having characteristics indicative of its altitude and course,
 determining the bearing of the first craft from the second craft, and
 utilizing said signals having characteristics of altitude to determine whether the altitude of the first craft is within a selected range of the altitude of the second craft,
 utilizing the bearing of the first craft from the second craft to determine that said first craft is in one of a set of relative bearing sectors from said second craft,
 utilizing said signals having characteristics of course to determine whether a course of said first craft is within a preselected range of courses relative to the course of said second craft, and
 indicating that said first craft is a navigational hazard to said second craft when the first craft altitude is within the preselected range of the second craft altitude, the first craft is in said one relative bearing sector and the first craft course is within the preselected range of the second craft course.

21. The method of indicating that a craft is a collision hazard to other craft comprising:
 transmitting signals from a first craft having characteristics indicative of its altitude and course,
 receiving said signal having characteristics indicative of the first craft's altitude on a second craft,
 generating a signal on said second craft having characteristics indicative of its altitude,
 determining the bearing of the first craft from the second craft,
 utilizing only said signals having characteristics of the first craft's altitude and the second craft's altitude and said bearing to determine whether one said craft is a hazard to the other, and
 receiving all said signals transmitted by said first craft at another location.

22. The method of indicating that a craft is a collision hazard to other craft comprising:
 transmitting a signal from a first craft having characteristics indicative of its altitude,
 receiving said signal having characteristics indicative of the first craft's altitude on a second craft,
 generating a signal on said second craft having characteristics indicative of its altitude,
 determining the bearing of the first craft from the second craft, and
 utilizing only said signals having characteristics of the first craft's altitude and the second craft's altitude and said bearing to determine whether one said craft is a hazard to the other.

23. The method of indicating that a craft is a collision hazard to other craft comprising:
 transmitting signals from a first craft having characteristics indicative of its altitude, course and velocity,
 receiving said signals having characteristics indicative of the first craft's altitude, course and velocity on a second craft,
 generating signals on said second craft having characteristics indicative of its altitude, course and velocity,
 determining the bearing of the first craft from the second craft,
 determining the range between said first and second craft, and
 utilizing only said signals having characteristics of the first craft's altitude, course and velcoity and the second craft's altitude, course and velocity, said bearing, and said range to determine whether one said craft is a hazard to the other.

24. The method of indicating that a craft is a collision hazard to other craft comprising:
transmitting signals from a first craft having characteristics indicative of its altitude, course and velocity,
receiving said signals having characteristics indicative of the first craft's altitude and course on a second craft,
generating signals on said second craft having characteristics indicative of its altitude and course,
determining the bearing of the first craft from the second craft,
determining the range between said first and second craft,
utilizing only said signals having characteristics of the first craft's altitude and course and the second craft's altitude and course, said bearing, and said range to determine whether one said craft is a hazard to the other, and
receiving all said signals transmitted by said first craft at another location.

25. The method of indicating that a craft is a collision hazard to other craft comprising:
transmitting signals from a first craft having characteristics indicative of its altitude, course and velocity,
receiving said signal having characteristics indicative of the first craft's altitude on a second craft,
generating signals on said second craft having characteristics indicative of its altitude,
determining the bearing of the first craft from the second craft,
determining the range between said first and second craft,
utilizing only said signals having characteristics of the first craft's altitude and the second craft's altitude, said bearing, and said range to determine whether one said craft is a hazard to the other, and
receiving all said signals transmitted by said first craft at another location.

26. The method of indicating that a craft is a collision hazard to other craft comprising:
transmitting signals from a first craft having characteristics indicative of its altitude and course,
receiving said signals having characteristics indicative of the first craft's altitude and course on a second craft,
generating signals on said second craft having characteristics indicative of its altitude and course,
determining the bearing of the first craft from the second craft,
determining the range between said first and second craft, and
utilizing only said signals having characteristics of the first craft's altitude and course and the second craft's altitude and course, said bearing, and said range to determine whether one said craft is a hazard to the other.

27. The method of indicating that a craft is a collision hazard to other craft comprising:
transmitting signals from a first craft having characteristics indicative of its altitude and course,
receiving said signal having characteristics indicative of the first craft's altitude on a second craft,
generating a signal on said second craft having characteristics indicative of its altitude,
determining the bearing of the first craft from the second craft,
determining the range between said first and second craft,
utilizing only said signals having characteristics of the first craft's altitude and the second craft's altitude, said bearing, and said range to determine whether one said craft is a hazard to the other, and
receiving all said signals transmitted by said first craft at another location.

28. The method of indicating that a craft is a collision hazard to other craft comprising:
transmitting signals from a first craft having characteristics indicative of its altitude,
receiving said signal having characteristics indicative of the first craft's altitude on a second craft,
generating a signal on said second craft having characteristics indicative of its altitude,
determining the bearing of the first craft from the second craft,
determining the range between said first and second craft, and
utilizing only said signals having characteristics of the first craft's altitude and the second craft's altitude, said bearing, and said range to determine whether one said craft is a hazard to the other.

29. The method of indicating that a craft is a collision hazard to other craft comprising:
transmitting signals from a first craft having characteristics indicative of its altitude, course and velocity,
receiving said signal having characteristics indicative of the first craft's altitude on a second craft,
generating a signal on said second craft having characteristics indicative of its altitude,
determining the range between said first and second craft,
utilizing only said signals having characteristics of the first craft's altitude and the second craft's altitude and said range to determine whether one said craft is a hazard to the other, and
receiving all said signals transmitted by said first craft at another location.

30. The method of indicating that a craft is a collision hazard to other craft comprising:
transmitting signals from a first craft having characteristics indicative of its altitude, course and velocity,
receiving said signals having characteristics indicative of the first craft's altitude and velocity on a second craft,
generating signals on said second craft having characteristics indicative of its altitude and velocity,
determining the range between said first and second craft,
utilizing only said signals having characteristics of the first craft's altitude and velocity and the second craft's altitude and velocity, and said range to determine whether one said craft is a hazard to the other, and
receiving all said signals transmitted by said first craft at another location.

31. The method of indicating that a craft is a collision hazard to other craft comprising:
transmitting signals from a first craft having characteristics indicative of its altitude and velocity,
receiving said signals having characteristics indicative of the first craft's altitude and velocity on a second craft,
generating signals on said second craft having characteristics indicative of its altitude and velocity,
determining the range between said first and second craft,
utilizing only said signals having characteristics of the first craft's altitude and velocity and the second craft's altitude and velocity, and said range to determine whether one said craft is a hazard to the other.

32. The method of indicating that a craft is a collision hazard to other craft comprising:
transmitting signals from a first craft having characteristics indicative of its altitude and velocity,
receiving said signal having characteristics indicative of the first craft's altitude on a second craft,
generating signals on said second craft having characteristics indicative of its altitude,
determining the range between said first and second craft,
utilizing only said signals having characteristics of the first craft's altitude and the second craft's altitude, and said range to determine whether one said craft is a hazard to the other, and receiving all said signals transmitted by said first craft at another location.

33. The method of indicating that a craft is a collision hazard to other craft comprising:

transmitting signals from a first craft having characteristics indicative of its altitude, receiving said signals having characteristics indicative of the first craft's altitude on a second craft, generating signals on said second craft having characteristics indicative of its altitude, determining the range between said first and second craft, and utilizing only said signals having characteristics of the first craft's altitude and the second craft's altitude, and said range to determine whether one said craft is a hazard to the other.

34. The method of indicating that a craft is a collision hazard to other craft comprising:

transmitting signals from a first craft having characteristics indicative of its altitude, course and velocity, receiving said signals having characteristics indicative of the first craft's altitude, course and velocity on a second craft, generating signals on said second craft having characteristics indicative of its altitude, course and velocity, determining the bearing of the first craft from the second craft, utilizing only said signals having characteristics of the first craft's altitude, course and velocity and the second craft's altitude, course and velocity and said bearing, to determine whether one said craft is a hazard to the other, receiving said signals having characteristics indicative of the first craft's altitude, course and velocity on a third craft, generating signals on said third craft having characteristics indicative of its altitude, course and velocity, determining the bearing of the first craft from the third craft, determining the range between said first and third craft, and utilizing said signals having characteristics of the first craft's altitude, course and velocity and the third craft's altitude, course and velocity, said bearing of the first craft from the third craft, and said range between said first and third crafts to determine whether said first craft is a hazard to the third craft.

35. A system for indicating the presence of a navigational hazard comprising:

a transmitter adapted to be carried by a first craft for generating signals indicating the actual altitude, course and velocity of said craft, a receiver carried by said craft for receiving other signals transmitted from a second craft and indicating the actual altitude and course of said second craft, a directional receiver means for indicating the relative bearing of said second craft, and means utilizing the signals limited to the actual altitudes and courses of said first and second craft and utilizing said directional receiver means to indicate whether said second craft is a navigational hazard to the first craft, said means requiring no other inputs to determine when said second craft is a navigational hazard to the first craft.

36. A system for indicating the presence of a navigational hazard comprising:

a transmitter adapted to be carried by a first craft for generating signals indicating the actual altitude, course and velocity of said craft, a receiver carried by said craft for receiving other signals transmitted from a second craft and indicating the actual altitude of said second craft, a directional receiver means for indicating the relative bearing of said second craft, and means utilizing the signals limited to the actual altitudes of said first and second craft and utilizing said directional receiver means to indicate whether said second craft is a navigational hazard to the first craft, said means requiring no other inputs to determine when said second craft is a navigational hazard to the first craft.

37. A system for indicating the presence of a navigational hazard comprising:

a transmitter adapted to be carried by a first craft for generating signals indicating the actual altitude and course of said craft, a receiver carried by said craft for receiving other signals transmitted from a second craft and indicating the actual altitude and course of said second craft, a directional receiver means for indicating the relative bearing of said second craft, means utilizing said altitude signals for determining whether the altitude of the second craft is within a selected range of the altitude of the first craft, means utilizing said indicated relative bearing of said second craft for determining that said second craft is in one of a set of relative bearing sectors from said first craft, means utilizing said course signals for determining whether a course of said second craft is within a preselected range of courses relative to the course of said first craft, and means for indicating that said second craft is a navigational hazard to said first craft connected to said altitude determining means, to said bearing sector determining means and to said course determining means for actuation when the second craft altitude is within the preselected range of the first craft altitude, the second craft is in said one relative bearing sector and the second craft course is within the preselected range of the first craft course.

38. A system for indicating the presence of a navigational hazard comprising:

a transmitter adapted to be carried by a first craft for generating signals indicating the actual altitude and course of said craft, a receiver carried by said craft for receiving other signals transmitted from a second craft and indicating the actual altitude of said second craft, a directional receiver means for indicating the relative bearing of said second craft, and means utilizing the signals limited to the actual altitudes of said first and second craft and utilizing said directional receiver means to indicate whether said second craft is a navigational hazard to the first craft, said means requiring no other inputs to determine when said second craft is a navigational hazard to the first craft.

39. A system for indicating the presence of a navigational hazard comprising:

a transmitter adapted to be carried by a first craft for generating signals indicating the actual altitude of said craft, a receiver carried by said craft for receiving other signals transmitted from a second craft and indicating the actual altitude of said second craft, a directional receiver means for indicating the relative bearing of said second craft, and a computer utilizing said signals and said directional receiver means to indicate whether said second craft is a navigational hazard to the first craft, said computer requiring no other inputs to determine when said second craft is a navigational hazard to the first craft.

40. A system for indicating the presence of a navigational hazard comprising:

a transmitter adapted to be carried by a first craft for generating signals indicating actual altitude, course and velocity of said craft, a receiver carried by said craft for receiving other signals transmitted from a second craft and indicating the actual altitude, course and velocity of said second craft, range measuring means carried by said first craft for determining the range of said second craft, a directional receiver means for indicating the relative bearing of said second craft, and means utilizing said signals, said range measuring means and said directional receiver means to indicate whether said second craft is a navigational hazard to the first craft.

41. A system for indicating the presence of a navigational hazard comprising:

a transmitter adapted to be carried by a first craft for generating signals indicating actual altitude, course and velocity of said craft, a receiver carried by said craft for receiving other signals transmitted from a second craft and indicating the actual altitude and course of said second craft, range measuring means carried by said first craft for determining the range of said second craft, a directional receiver means for indicating the relative bearing of said second craft, and means utilizing the signals limited to the actual altitudes and courses of said first and second craft, said range measuring means and said directional receiver means to indicate whether said second craft is a navigational hazard to the first craft, said means requiring no other inputs to determine when said second craft is a navigational hazard to the first craft.

42. A system for indicating the presence of a navigational hazard comprising:

a transmitter adapted to be carried by a first craft for generating signals indicating the actual altitude, course and velocity of said craft, a receiver carried by said craft for receiving other signals transmitted from a second craft and indicating the actual altitude of said second craft, range measuring means carried by said first craft for determining the range of said second craft, a directional receiver means for indicating the relative bearing of said second craft, and means utilizing the signals limited to the actual altitudes of said first and second craft, said range measuring means and said directional receiver means to indicate whether said second craft is a navigational hazard to the first craft, said means requiring no other inputs to determine when said second craft is a navigational hazard to the first craft.

43. A system for indicating the presence of a navigational hazard comprising:

a transmitter adapted to be carried by a first craft for generating signals indicating the actual altitude and course of said craft, a receiver carried by said craft for receiving other signals transmitted from a second craft and indicating the actual altitude and course of said second craft, range measuring means carried by said first craft for determining the range of said second craft, a dircetional receiver means for indicating the relative bearing of said second craft, and means utilizing said signals, said range measuring means and said directional receiver means to indicate whether said second craft is a navigational hazard to the first craft, said means requiring no other inputs to determine when said second craft is a navigational hazard to the first craft.

44. A system for indicating the presence of a navigational hazard comprising:

a transmitter adapted to be carried by a first craft for generating signals indicating the actual altitude and course of said craft, a receiver carried by said craft for receiving other signals transmitted from a second craft and indicating the actual altitude of said second craft, range measuring means carried by said first craft for determining the range of said second craft, a directional receiver means for indicating the relative bearing of said second craft, and means utilizing said signals limited to the actual altitudes of said first and second craft, said range measuring means and said directional receiver means to indicate whether said second craft is a navigational hazard to the first craft, said means requiring no other inputs to determine when said second craft is a navigational hazard to the first craft.

45. A system for indicating the presence of a navigational hazard comprising:

a transmitter adapted to be carried by a first craft for generating signals indicating the actual altitude of said craft, a receiver carried by said craft for receiving other signals transmitted from a second craft and indicating the actual altitude of said second craft, range measuring means carried by said first craft for determining the range of said second craft, a directional receiver means for indicating the relative bearing of said second craft, and a computer utilizing said signals, said range measuring means and said directional receiver means to indicate whether said second craft is a navigational hazard to the first craft, said means requiring no other inputs to determine when said second craft is a navigational hazard to the first craft.

46. A system for indicating the presence of a navigational hazard comprising:

a transmitter adapted to be carried by a first craft for generating signals indicating the actual altitude, course and velocity of said craft, a receiver carried by said craft for receiving other signals transmitted from a second craft and indicating the actual altitude of said second craft, range measuring means carried by said first craft for determining the range of said second craft, and means utilizing signals limited to the altitudes of said first and second craft and said range measuring means to indicate whether said second craft is a navigational hazard to the first craft, said means requiring no other inputs to determine when said second craft is a navigational hazard to the first craft.

47. A system for indicating the presence of a navigational hazard comprising:

a transmitter adapted to be carried by a first craft for generating signals indicating the actual altitude, course and velocity of said craft, a receiver carried by said craft for receiving other signals transmitted from a second craft and indicating the actual altitude and velocity of said second craft, range measuring means carried by said first craft for determining the range of said second craft, and means utilizing the signals limited to the actual altitudes and velocities of said first and second craft and said range measuring means to indicate whether said second craft is a navigational hazard to the first craft, said means requiring no other inputs to determine when said second craft is a navigational hazard to the first craft.

48. A system for indicating the presence of a navigational hazard comprising:

a transmitter adapted to be carried by a first craft for generating signals indicating the actual altitude and velocity of said craft, a receiver carried by said craft for receiving other signals transmitted from a second craft and indicating the actual altitude and velocity of said second craft, range measuring means carried by said first craft for determining the range of said second craft, and means utilizing said signals and said range measuring means to indicate whether said second craft is a navigational hazard to the first craft, said means requiring no other inputs to determine when said second craft is a navigational hazard to the first craft.

49. A system for indicating the presence of a navigational hazard comprising:

a transmitter adapted to be carried by a first craft for generating signals indicating the actual altitude and velocity of said craft, a receiver carried by said craft for receiving other signals transmitted from a second craft and indicating the actual altitude of said second craft, range measuring means carried by said first craft for determining the range of said second craft, and means utilizing the signals limited to the actual altitudes of said first and second craft and said range measuring means to indicate whether said second craft is a navigational hazard to the first craft, said means requiring no other inputs to determine when said second craft is a navigational hazard to the first craft.

50. A system for indicating the presence of a navigational hazard comprising:

a transmitter adapted to be carried by a first craft for generating signals indicating the actual altitude of said craft, a receiver carried by said craft for receiving other signals transmitted from a second craft and indicating the actual altitude of said second craft, range measuring means carried by said first craft for determining the range of said second craft, and a computer utilizing said signals and said range measuring means to indicate whether said second craft is a navigational hazard to the first craft, said means requiring no other inputs to determine when said second craft is a navigational hazard to the first craft.

51. A system for indicating the presence of a navigational hazard comprising:

a transmitter adapted to be carried by a first craft for generating signals indicating the actual altitude, course and velocity of said craft, a receiver carried by said craft for receiving other signals transmitted from a second craft and indicating the actual altitude, course and velocity of said second craft, a directional receiver means for indicating the relative bearing of said second craft, and electronic computing means utilizing said signals and said directional receiver means to indicate whether said second craft is a navigational hazard to the first craft, said computing means receiving indication of said altitudes, courses, and velocities and said relative bearing through circuits connected in parallel with each other to said computing means.

52. A computer comprising:

means for determining whether an altitude of a first craft is within a selected range of the altitude of a second craft, means for determining that said first craft is in one of a set of relative bearing sectors from said second craft, means for determining whether a course of said first craft is within a preselected range of courses relative to the course of said second craft, and means for indicating that said first craft is a navigational hazard to said second craft connected to said altitude determining means, to said bearing sector determining means and to said course determining means for actuation when the first craft altitude is within the preselected range of the second craft altitude, the first craft is in said one relative bearing sector and the first craft course is within the preselected range of the second craft course, said altitude determining means, said bearing sector determining means, and said course determining means being connected in parallel with each other to said indicating means.

53. A computer comprising:

means for determining whether an altitude of a first craft is within a preselected range of the altitude of a second craft, means for determining that said first craft is in one of a set of relative bearing sectors from said second craft, means for determining whether a course of said first craft is within a preselected range of courses relative to the course of said second craft, means for determining whether said first craft is at an altitude above or below said second craft, and a collision avoidance maneuver indicator connected to said altitude determining means to said bearing sector determining means, to said course determining means and to said means for determining whether said first craft is above or below, said altitude determining means, said bearing sector determining means and said course determining means being connected in parallel with each other to said indicating means.

54. A computer comprising:

means for determining whether an altitude of a first craft is within a preselected range of the altitude of a second craft, means for determining whether said first craft has a higher or lower velocity than said second craft, direction finding means for determining the relative bearing of said first craft from said second craft, means for determining whether a course of said first craft is within one of a preselected set of ranges relative to the course of said second craft, and means for indicating that said first craft is a navigational hazard to said second craft connected to said altitude determining means, to said velocity determining means, to said direction finding means, and to said course determining means for actuation when the first craft altitude is within the preselected range of the second craft altitude and the first craft course is within the range of courses selected from said set, said altitude determining means, said velocity determining means, said direction finding means and said course determining means being connected in parallel with each other to said indicating means.

55. A computer comprising:

means for determining whether an altitude of a first craft is within a preselected range of the altitude of a second craft, means for determining whether said first craft has a higher or lower velocity than said second craft, direction finding means for determining the relative bearing of said first craft from said second craft, means for determining whether a course of said first craft is within one of a preselected set of ranges relative to the course of said second craft, means for determining whether said first craft is at an altitude above or below said second craft, and a collision avoidance maneuver indicator connected to said altitude determining means, to said direction finding means, to said velocity determining means, to said course determining means and to said means for determining whether said first craft is above or below, said altitude determining means, said velocity determining means, said direction finding means and said course determining means being connected in parallel with each other to said indicating means.

56. A computer comprising:

means for determining whether an altitude of a first craft is within a preselected range of the altitude of a second craft, means for determining whether the velocity of said first craft relative to the velocity of said second craft is within one preselected range of velocity values of a set of preselected ranges of velocity values which are relative to the velocity of said second craft, means for determining whether the distance between said first and second craft is within one preselected range of distance values of a set of preselected values, and means for indicating said first craft is a navigational hazard to said second craft connected to said altitude determining means, said velocity determining means and said distance determining means for actuation when said first craft altitude is within a preselected range of said second craft altitude and said first craft velocity and distance from said second craft form a predetermined hazardous velocity-distance combination.

57. A computer comprising:

means for determining whether an altitude of a first craft is within a predetermined range of the altitude of a second craft, means for determining whether the velocity of said first craft relative to the velocity of said second craft is within one preselected range of velocity values of a set of preselected ranges of velocity values which are relative to the velocity of said second craft, means for determining whether the distance between said first and second craft is within one preselected range of distance values of a set of selected values, means for determining whether said first craft is at an altitude above or below said second craft, and a collision avoidance maneuver indicator connected to said altitude determining means, to said velocity determining means, to said distance determining means, and to said means for determining whether said first craft is above or below.

58. A computer comprising:

means for determining whether an altitude of a first craft is within a preselected range of the altitude of a second craft, means for determining whether the distance of said first craft from said second craft is within a preselected range, means for indicating that said first craft is a navigational hazard to said second craft connected to said altitude determining means and to said distance determining means for actuation when the altitude of said first craft is within the preselected range of the second craft altitude and the distance of said first craft from the second craft is within the preselected range.

59. A computer comprising:

means for determining whether an altitude of a first craft is within a predetermined range of the altitude of a second craft, means for determining whether the distance of said first craft from said second craft is within a preselected range, means for determining whether said first craft is at an altitude above or below said second craft, and a collision avoidance maneuver indicator connected to said altitude determining means, to said distance determining means and to said means for determining whether said first craft is above or below.

60. A computer comprising:

means for determining that a first craft is in one of a set of relative bearing sectors from a second craft, means for determining whether a course of said first craft is within a preselected range of courses relative to the course of said second craft, and means for indicating that said first craft is a navigational hazard to said second craft connected to said course determining means and to said bearing sector determining means for actuation when the course of said first craft is within the preselected range of the first craft course and the first craft is in said one relative bearing sector, said bearing sector determining means and said course determining means being connected in parallel with each other to said indicating means.

61. A computer comprising:

means for determining whether a first craft has a higher or lower velocity than a second craft, direction finding means for determining the relative bearing of said first craft from said second craft, means for determining whether a course of said first craft is within one of a preselected set of ranges relative to the course of said second craft, and means for indicating that said first craft is a navigational hazard to said second craft connected to said velocity determining means, to said direction finding means and to said course determining means for actuation when the first craft course is within the range of courses selected from said set, said velocity determining means, said direction finding means and said course determining means being connected in parallel with each other to said indicating means.

62. A computer comprising:

means for determining whether the actual velocity of a first craft is within one preselected range of actual velocity values of a set of preselected ranges of actual velocity values, means for determining whether the distance said first and second craft is within one preselected range of distance values of a set of preselected values, and means for indicating said first craft is a navigational hazard to said second craft connected to said velocity determining means and said distance determining means for actuation when said first craft actual velocity and distance from said second craft form a predetermined hazardous velocity distance combination.

63. A computer comprising:

means for determining whether the distance of a first craft from a second craft is within a preselected range by comparing the elapsed time between a signal transmitted by the second craft and a signal received from said first craft in response to said second craft signal, and means for indicating that said first craft is a navigational hazard to said second craft connected to said distance determining means for actuation when the distance of said first craft from said second craft is within the preselected range, said means requiring no other input than an input signal from said distance determining means.

64. A computer comprising:

means for combining a first craft actual course and actual velocity and a relative bearing of a second craft from said first craft to obtain a velocity vector component of said first craft perpendicular to a line between said first and second craft, means for combining a second craft actual course and actual velocity and a relative bearing of the first craft from said second craft to obtain a velocity vector component of said second craft perpendicular to the line between said first and second craft, and comparison means for determining whether the difference of the first craft velocity vector component and the second craft velocity vector component is within a preselected range of values.

65. A computer comprising:

means for combining a first craft actual course and actual velocity and a relative bearing of a second craft from said first craft to obtain a velocity vector component of said first craft perpendicular to a line between said first and second craft, means for combining a second craft actual course and actual velocity and a relative bearing of the first craft from said second craft to obtain a velocity vector component of said second craft perpendicular to the line between said first and second craft, and comparison means for determining whether the difference of the first craft velocity vector component and the second craft velocity vector component is within a preselected range of values, means for determining whether an altitude of the first craft is within a preselected range of the altitude of said second craft, and means for indicating that said first craft is a navigational hazard to said second craft connected to said altitude determining means and to said comparison means for actuation when the first craft altitude is within the preselected range of the second craft altitude and the difference between said first and second craft velocity vector components is within a preselected range of values.

References Cited by the Examiner

UNITED STATES PATENTS

| | | |
|---|---|---|
| 2,157,122 | 5/1939 | Dunmore. |
| 2,480,123 | 8/1949 | Deloraine et al. |
| 2,554,893 | 5/1951 | Brunn. |
| 2,568,568 | 9/1951 | Stansbury. |
| 2,980,908 | 4/1961 | Vielle. |
| 3,019,434 | 1/1962 | Bushnell et al. |
| 3,089,139 | 5/1963 | Hovannesian et al. |
| 3,114,146 | 12/1963 | Wiersma et al. |
| 3,208,064 | 9/1965 | Morrel. |

OTHER REFERENCES

"Radio Collision Avoidance Systems for Aircraft," by R. T. Fitzgerald, H. C. Brown, and M. D. Reed, Sept. 15, 1959, Diamond Ordnance Fuze Laboratories, Ordnance Corps, Department of the Army, Washington, D.C., pp. 28–36 relied on.

References Cited by the Applicant

UNITED STATES PATENTS

| | | |
|---|---|---|
| 2,501,109 | 3/1950 | Wallace. |
| 3,045,231 | 7/1962 | Lakatos et al. |
| 3,071,767 | 1/1963 | Freedman. |
| 3,091,764 | 5/1963 | Tatel. |
| 3,095,566 | 6/1963 | Dethloff et al. |
| 3,097,354 | 7/1963 | Blowney et al. |

RODNEY D. BENNETT, *Acting Primary Examiner.*

CHESTER L. JUSTUS, *Examiner.*

R. E. BERGER, *Assistant Examiner.*